US012603999B2

(12) United States Patent
Ikeda

(10) Patent No.: US 12,603,999 B2
(45) Date of Patent: Apr. 14, 2026

(54) IMAGE PROCESSING APPARATUS AND IMAGE PROCESSING METHOD

(71) Applicant: Sony Group Corporation, Tokyo (JP)

(72) Inventor: Masaru Ikeda, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/827,859

(22) Filed: Sep. 9, 2024

(65) Prior Publication Data

US 2024/0430417 A1 Dec. 26, 2024

Related U.S. Application Data

(60) Continuation of application No. 18/193,641, filed on Mar. 31, 2023, now Pat. No. 12,137,219, which is a (Continued)

(30) Foreign Application Priority Data

| | | |
|---|---|---|
| Mar. 29, 2018 | (JP) | ................................. 2018-065130 |
| Jun. 1, 2018 | (JP) | ................................. 2018-106367 |

(51) Int. Cl.
*H04N 19/17* (2014.01)
*H04N 19/117* (2014.01)
(Continued)

(52) U.S. Cl.
CPC ......... *H04N 19/117* (2014.11); *H04N 19/176* (2014.11); *H04N 19/186* (2014.11); *H04N 19/189* (2014.11); *H04N 19/82* (2014.11)

(58) Field of Classification Search
CPC ........ H03M 1/00; H03M 1/0626; H03M 1/66; H03M 1/662; H03M 1/742; H03M 1/747;
(Continued)

(56) References Cited

U.S. PATENT DOCUMENTS

| | | | |
|---|---|---|---|
| 6,269,185 B1 * | 7/2001 | Takai | ................... H04N 1/6019 |
| | | | 358/518 |
| 2005/0002646 A1 * | 1/2005 | Sato | ....................... H04N 19/44 |
| | | | 375/E7.172 |

(Continued)

FOREIGN PATENT DOCUMENTS

| | | |
|---|---|---|
| CN | 103229506 A | 7/2013 |
| CN | 106954067 A | 7/2017 |

(Continued)

OTHER PUBLICATIONS

International Search Report and Written Opinion mailed on Mar. 19, 2019 for PCT/JP2018/047039 filed on Dec. 20, 2018, 11 pages including English Translation of the International Search Report.

(Continued)

*Primary Examiner* — Md N Haque
(74) *Attorney, Agent, or Firm* — XSENSUS LLP

(57) ABSTRACT

An image processing apparatus is provided. The image processing apparatus includes a decoding unit configured to generate a decoded image by decoding a coded stream, a determination unit configured to adopt a block boundary of the decoded image as a target and determine deblocking filter application necessity with respect to color difference components of the decoded image based on boundary strength that is calculated using a color difference related parameter related to a color difference, and a filtering unit configured to apply a deblocking filter to color difference components of pixels located in a vicinity of the block boundary based on a determination result of the deblocking filter application necessity.

16 Claims, 13 Drawing Sheets

| O: TRUE   X :FALSE   N/A: IRRELEVANT |
|---|

| bS | CONDITION A (INTRA PREDICTION) | CONDITION B1-Y (SIGNIFICANT COEFFICIENT OF Y) | CONDITION B1-U (SIGNIFICANT COEFFICIENT OF U) | CONDITION B1-V (SIGNIFICANT COEFFICIENT OF V) | CONDITION B2 (WP/REFERENCE PICTURE) |
|---|---|---|---|---|---|
| 16=10000 | O | N/A | N/A | N/A | N/A |
| 14=01110 | X | O | O | O | X |
| 12=01100 | X | O | O | X | X |
| 10=01010 | X | O | X | O | X |
| 8=01000 | X | O | X | X | X |
| 6=00110 | X | X | O | O | X |
| 4=00100 | X | X | O | X | X |
| 2=00010 | X | X | X | O | X |
| 1=00001 | X | N/A | N/A | N/A | O |
| 0=00000 | X | X | X | X | X |

Related U.S. Application Data division of application No. 16/980,851, filed as application No. PCT/JP2018/047039 on Dec. 20, 2018, now abandoned.

(51) Int. Cl.

| | |
|---|---|
| *H04N 19/176* | (2014.01) |
| *H04N 19/186* | (2014.01) |
| *H04N 19/189* | (2014.01) |
| *H04N 19/82* | (2014.01) |

(58) Field of Classification Search

CPC .. H04N 19/117; H04N 19/157; H04N 19/176; H04N 19/186; H04N 19/189; H04N 19/82; H04N 19/86

See application file for complete search history.

(56) References Cited

U.S. PATENT DOCUMENTS

| | | | | |
|---|---|---|---|---|
| 2007/0140355 | A1* | 6/2007 | Uchida | H04N 19/61 375/E7.093 |
| 2008/0095244 | A1* | 4/2008 | Kim | H04N 19/527 375/E7.189 |
| 2008/0317377 | A1 | 12/2008 | Saigo et al. | |
| 2011/0255797 | A1 | 10/2011 | Ikai | |
| 2012/0281749 | A1 | 11/2012 | Ikai | |
| 2013/0051480 | A1 | 2/2013 | Norkin et al. | |
| 2013/0101024 | A1 | 4/2013 | Van der Auwera et al. | |
| 2014/0112396 | A1* | 4/2014 | Ikeda | H04N 19/42 375/240.29 |
| 2014/0204999 | A1 | 7/2014 | Park et al. | |
| 2014/0348247 | A1 | 11/2014 | Tsukuba et al. | |
| 2014/0369428 | A1 | 12/2014 | Park et al. | |
| 2015/0358631 | A1 | 12/2015 | Zhang et al. | |
| 2016/0261884 | A1 | 9/2016 | Li et al. | |
| 2017/0048548 | A1 | 2/2017 | Narroschoke et al. | |
| 2017/0289544 | A1* | 10/2017 | Lu | H04N 19/117 |
| 2018/0091812 | A1 | 3/2018 | Guo et al. | |
| 2018/0205948 | A1 | 7/2018 | Kawamura et al. | |
| 2019/0394463 | A1 | 12/2019 | Chen et al. | |

FOREIGN PATENT DOCUMENTS

| | | | |
|---|---|---|---|
| CN | 110115039 | A | 8/2019 |
| JP | 2014090326 | A | 5/2014 |
| JP | 2017069810 | A | 4/2017 |
| JP | 2017-523677 | A | 8/2017 |
| JP | 7294322 | B2 | 6/2023 |
| JP | 2023092309 | | 6/2023 |
| JP | 7533694 | B2 | 8/2024 |
| KR | 10-2020-0090984 | A | 7/2020 |
| WO | 2012124406 | A1 | 9/2012 |
| WO | 2013001957 | A1 | 1/2013 |
| WO | 2013/060250 | A1 | 5/2013 |
| WO | 2013/077714 | A1 | 5/2013 |
| WO | 2014045919 | A1 | 3/2014 |
| WO | 2017/056665 | A1 | 4/2017 |

OTHER PUBLICATIONS

Hsu, C.W., et al., "CE12.3.2: Reducing pixel line buffers by modifying DF for horizontal LCU boundaries," Joint Collaborative Team on Video Coding (JCT-VC) of ITU-T SG16 WP3 and ISO/IEC JTC1/SC29/WG11, JCTVC-G228, 7th Meeting, Geneva, CH, Nov. 21-30, 2011, pp. 1-7.

Huang, Q., et al., "CE10 Subtest 1: Chroma Deblocking Filter," Joint Collaborative Team on Video Coding (JCT-VC) of ITU-T SG16 WP3 and ISO/IEC JTC1/SC29/WG11, JCTVC-H0310, 8th Meeting, San Jose, US, Feb. 1-10, 2012, pp. 1-5.

Ikeda, M., and Suzuki, T., "CE12 Subtest3: deblocking vertical tap reduction for line buffer based on JCTVC-F215," Joint Collaborative Team on Video Coding (JCT-VC) of ITU-T SG16 WP3 and ISO/IEC JTC1/SC29/WG11, JCTVC-G257, 7th Meeting, Geneva, CH, Nov. 21-30, 2011, pp. 1-5.

Kim, S.H., et al., "Improvement of chroma deblocking filter," Joint Video Exploration Team (JVET) of ITU-T SG16 WP3 and ISO/IEC JTC1/SC29/WG11, JVET-D0108, 4th Meeting, Chengdu, CN, Oct. 15-21, 2016, pp. 1-6.

Okubo, S., et al., "H.265/HEVC Textbook" First Edition, Impress Corporation, Oct. 21, 2013, pp. 150-157.

Andrey Norkin et al: "Chapter 7: In-Loop Filters in HEVC" In: "High Efficiency Video Coding (HEVC)", Aug. 23, 2014 (Aug. 23, 2014). Springer International Publishing. Cham, XP055614202. ISBN: 978-3-319-06894-7 pp. 171-208, DOI:10. 1007/978-3-319-06895-4_7, Chapter 7.2.2 figures 7.5. 7.6 7.7 table 7.1.

Ikeda (Sony) M et al., "CE2: Long-tap deblocking filter for luma and chroma ( CE2-2.1.6)" Joint Video Experts Team (JVET) of ITU-T SG 16 WP 3 and ISO/IEC JTC 1/SC 29/WG 11, JVET-K0152-v2, Jul. 10-18, 2018, 10 pages.

J. Chen, E. Alshina, et al., "Algorithm Description of Joint Exploration Test Model (JEM7)" JVET-G1001, Joint Video Exploration Team (JVET) of ITU-T SG 16 WP 3 and ISO/IEC JTC 1/SC 29/WG 11 7th Meeting: Torino, IT, Jul. 13-21, 2017.

De Souza, Diego F, et al., "Cooperative CPU+GPU Deblocking Filter Parallelization for High Performance HEVC Video Codecs", 2014 IEEE International Conference on Acoustic, Speech and Signal Processing (Icassp), IEEE, May 4, 2014 (2014-05-04), pp. 4993-4997, XP032616965.

\* cited by examiner

| bS | Y | U | V |
|---|---|---|---|
| 2 | CONDITION ON INTRA PREDICTION (CONDITION A) | | |
| 1 | CONDITION ON SIGNIFICANT COEFFICIENT OF Y (CONDITION B1) | N/A | |
| | CONDITION ON MV AND REFERENCE PICTURE (CONDITION B2) | N/A | |
| 0 | Others | | |

| bS | Y | U | V |
|---|---|---|---|
| 2 | CONDITION ON INTRA PREDICTION (CONDITION A) | | |
| 1 | CONDITION ON SIGNIFICANT COEFFICIENT OF Y (CONDITION B1) | | |
| | CONDITION ON MV AND REFERENCE PICTURE (CONDITION B2) | | |
| 0 | Others | | |

FIG.4

| bS | Y | U | V |
|----|---|---|---|
| 16 | CONDITION ON INTRA PREDICTION (CONDITION A) | | |
| 2-14 | CONDITION ON SIGNIFICANT COEFFICIENT OF Y (CONDITION B1-Y) | CONDITION ON SIGNIFICANT COEFFICIENT OF U (CONDITION B1-U) | CONDITION ON SIGNIFICANT COEFFICIENT OF U (CONDITION B1-V) |
| 1 | CONDITION ON MV AND REFERENCE PICTURE (CONDITION B2) | | |
| 0 | Others | | |

FIG.7

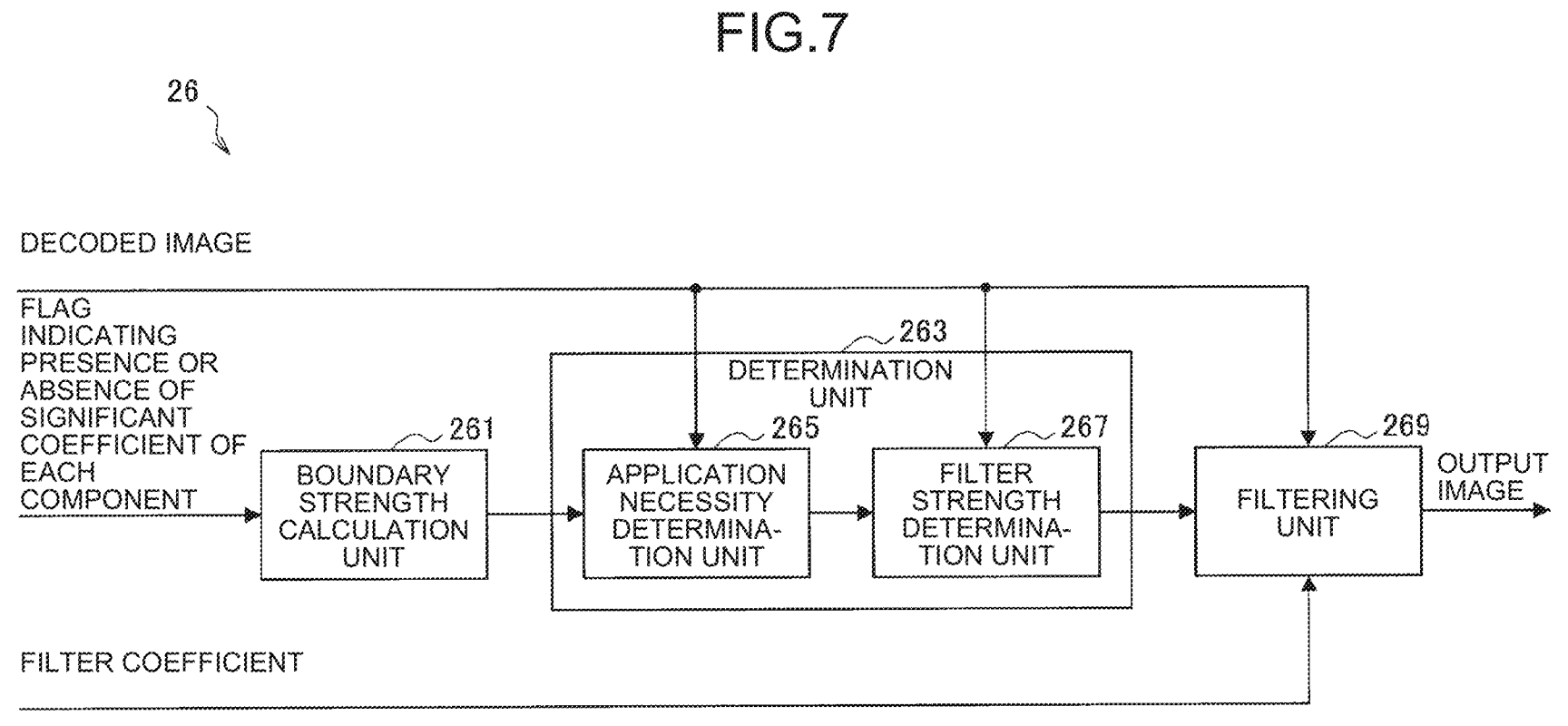

DECODED IMAGE

FLAG
INDICATING
PRESENCE OR
ABSENCE OF
SIGNIFICANT
COEFFICIENT OF
EACH
COMPONENT

FILTER COEFFICIENT

26

261

BOUNDARY
STRENGTH
CALCULATION
UNIT

263

DETERMINATION
UNIT

265

APPLICATION
NECESSITY
DETERMINA-
TION UNIT

267

FILTER
STRENGTH
DETERMINA-
TION UNIT

269

FILTERING
UNIT

OUTPUT
IMAGE

FIG.8

○: TRUE   × : FALSE   N/A: IRRELEVANT

| bS | CONDITION A (INTRA PREDICTION) | CONDITION B1-Y (SIGNIFICANT COEFFICIENT OF Y) | CONDITION B1-U (SIGNIFICANT COEFFICIENT OF U) | CONDITION B1-V (SIGNIFICANT COEFFICIENT OF V) | CONDITION B2 (MV/REFERENCE PICTURE) |
|---|---|---|---|---|---|
| 16=10000 | ○ | N/A | N/A | N/A | N/A |
| 14=01110 | × | ○ | ○ | ○ | × |
| 12=01100 | × | ○ | ○ | × | × |
| 10=01010 | × | ○ | × | ○ | × |
| 8=01000 | × | ○ | × | × | × |
| 6=00110 | × | × | ○ | ○ | × |
| 4=00100 | × | × | ○ | × | × |
| 2=00010 | × | N/A | N/A | N/A | × |
| 1=00001 | × | N/A | N/A | N/A | ○ |
| 0=00000 | × | × | × | × | × |

FIG.11

○:TRUE   ×:FALSE   N/A: IRRELEVANT

| bS | CONDITION A (INTRA PREDICTION) | CONDITION B1-Y (SIGNIFICANT COEFFICIENT OF Y) | CONDITION B1-U (SIGNIFICANT COEFFICIENT OF U) | CONDITION B1-V (SIGNIFICANT COEFFICIENT OF V) | CONDITION B2 (MV/REFERENCE PICTURE) |
|---|---|---|---|---|---|
| 16=10000 | ○ | N/A | N/A | N/A | N/A |
| 14=01110 | × | ○ | ○ | ○ | N/A |
| 12=01100 | × | ○ | ○ | × | N/A |
| 10=01010 | × | ○ | × | ○ | N/A |
| 8=01000 | × | ○ | × | × | N/A |
| 7=00111 | × | × | ○ | ○ | ○ |
| 6=00110 | × | × | ○ | ○ | × |
| 5=00101 | × | × | ○ | × | ○ |
| 4=00100 | × | × | ○ | × | × |
| 3=00011 | × | × | × | ○ | ○ |
| 2=00010 | × | × | × | ○ | × |
| 1=00001 | × | × | × | × | ○ |
| 0=00000 | × | × | × | × | × |

FIG.14

| bS | Y | U | V |
|---|---|---|---|
| 16 | CONDITION ON INTRA PREDICTION (CONDITION A) | | |
| 2~14 | CONDITION ON SIGNIFICANT COEFFICIENT OF Y (CONDITION B1-Y) | CONDITION ON SIGNIFICANT COEFFICIENT OF U (CONDITION B1-U) | CONDITION ON SIGNIFICANT COEFFICIENT OF U (CONDITION B1-V) |
| 1 | CONDITION ON MV AND REFERENCE PICTURE (CONDITION B2) | N/A | N/A |
| 0 | Others | | |

IMAGE PROCESSING APPARATUS AND IMAGE PROCESSING METHOD

CROSS-REFERENCE TO RELATED APPLICATIONS

The present application is a Continuation of U.S. application Ser. No. 18/193,641, filed Mar. 31, 2023, which is a Divisional of U.S. application Ser. No. 16/980,851, filed Sep. 15, 2020, which is based on PCT filing PCT/JP2018/047039, filed Dec. 20, 2018, which claims priority to JP 2018-065130, filed Mar. 29, 2018, and JP 2018-106367, filed Jun. 1, 2018, the entire contents of each are incorporated herein by reference.

FIELD

The present disclosure relates to an image processing apparatus and an image processing method.

BACKGROUND

In H.265/HEVC, which is one of standard specifications of a video coding system, a deblocking filter is applied to a block boundary of a decoded image to prevent degradation of image quality due to block distortion that occurs at the time of coding. In H.265/HEVC, a deblocking filter applicable to a luminance component includes two kinds of filters, such as a weak filter and a strong filter, whereas a deblocking filter applicable to color difference components includes only a single kind of a filter, such as the weak filter.

In addition, to further improve a coding efficiency as compared to H.265/HEVC, Joint Video Experts Team (JVET), which is a joint standards organization of ITU-T and ISO/IEC, is currently promoting standardization operation on Future Video Coding (FVC) that is a next-generation video coding system (for example, see Non Patent Literature 1).

As for the standardization operation on FVC, in Non Patent Literature 2 described below, a technique of changing the deblocking filter applicable to the color difference components to two kinds of filters similarly to the deblocking filter applicable to the luminance component, and allowing the strong filter to be applied even to the color difference components has been proposed.

CITATION LIST

Non Patent Literature

Non Patent Literature 1: J. Chen, E. Alshina, G. J. Sullivan, J.-R. Ohm, J. Boyce, "Algorithm Description of Joint Exploration Test Model (JEM7)", JVET-G1001, Joint Video Exploration Team (JVET) of ITU-T SG 16 WP 3 and ISO/IEC JTC 1/SC 29/WG 11 7th Meeting: Torino, IT, 13-21 Jul. 2017

Non Patent Literature 2: Seung-Hwan Kim, Jie Zhao, Misra Kiran and Andrew Segall, "Improvement of chroma deblocking filter", JVET-D0108, Joint Video Exploration Team (JVET) of ITU-T SG 16 WP 3 and ISO/IEC JTC 1/SC 29/WG 11 4th Meeting: Chengdu, CN, 15-21 Oct. 2016

SUMMARY

Technical Problem

Necessity of application of the deblocking filter as described above is determined using boundary strength of the block boundary, and the boundary strength of the block boundary is calculated based on information on the luminance component without using information on the color difference components. However, if necessity of application of the deblocking filter to the color difference components of a decoded image is determined using the boundary strength that is identified based on the information on the luminance component, it may be difficult to appropriately apply the deblocking filter and block distortion may remain in some cases.

Therefore, in the present disclosure, a system capable of more appropriately applying the deblocking filter to the color difference components of the decoded image is proposed.

Solution to Problem

According to the disclosure, an image processing apparatus is provided. The image processing apparatus includes a decoding unit configured to generate a decoded image by decoding a coded stream, a determination unit configured to adopt a block boundary of the decoded image as a target and determine deblocking filter application necessity with respect to color difference components of the decoded image based on boundary strength that is calculated using a color difference related parameter related to a color difference, and a filtering unit configured to apply a deblocking filter to color difference components of pixels located in a vicinity of the block boundary based on a determination result of the deblocking filter application necessity.

Moreover, according to the disclosure, an image processing method is provided. The image processing method includes generating a decoded image by decoding a coded stream, adopting a block boundary of the decoded image as a target, determining deblocking filter application necessity with respect to color difference components of the decoded image based on boundary strength that is calculated using a color difference related parameter related to a color difference, and applying a deblocking filter to color difference components of pixels located in a vicinity of the block boundary based on a determination result of the deblocking filter application necessity.

Moreover, according to the disclosure, an image processing apparatus is provided. The image processing apparatus includes a determination unit configured to adopt, as a target, a block boundary of a decoded image that is locally decoded, and determine deblocking filter application necessity with respect to color difference components of the decoded image based on boundary strength that is calculated using a color difference related parameter related to a color difference, a filtering unit configured to apply a deblocking filter to color difference components of pixels located in a vicinity of the block boundary based on a determination result of the deblocking filter application necessity, and a coding unit configured to encode an image using the decoded image to which the deblocking filter is applied by the filtering unit.

Moreover, according to the disclosure, an image processing method is provided. The image processing method includes adopting, as a target, a block boundary of a decoded image that is locally decoded, determining deblocking filter application necessity with respect to color difference components of the decoded image based on boundary strength that is calculated using a color difference related parameter related to a color difference, applying a deblocking filter to color difference components of pixels located in a vicinity of the block boundary based on a determination result of the deblocking filter application necessity, and coding an image using the decoded image to which the deblocking filter is applied.

Advantageous Effects of Invention

As described above, according to the present disclosure, it is possible to more appropriately apply a deblocking filter to color difference components of a decoded image.

Further, the effects described above are not limitative. That is, with or in the place of the above effects, any of the effects described in the present specification or other effects that may be recognized from the present specification may be achieved.

BRIEF DESCRIPTION OF DRAWINGS

FIG. 4 is a table for explaining calculation of bS according to one embodiment of the present disclosure.

FIG. 7 is a block diagram illustrating an example of a detail configuration of a deblocking filter 26 according to one embodiment.

FIG. 8 is a table illustrating an example of bS calculated by a boundary strength calculation unit 261.

FIG. 11 is a table illustrating a modification of bS calculated by the boundary strength calculation unit 261.

FIG. 14 is a table illustrating another modification of calculation of bS.

DESCRIPTION OF EMBODIMENTS

Figures 1, 2, 3:
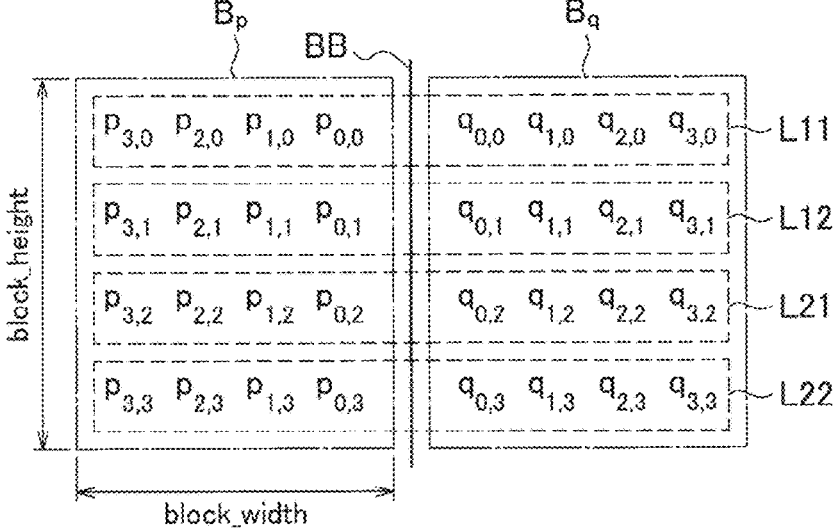
FIG. 1 is a table for explaining calculation of bS in HEVC.
FIG. 2 is a table for explaining calculation of bS in Non Patent Literature 2.
FIG. 3 is an explanatory diagram illustrating an example of pixels of color difference components (U components and V components) in two blocks Bp and Bq that are adjacent to each other across a vertical block boundary BB.

Preferred embodiments of the present disclosure will be described in detail below with reference to the accompanying drawings. In this specification and the drawings, structural elements that have substantially the same functions and configurations will be denoted by the same reference symbols, and repeated explanation of the structural elements will be omitted.

Further, the scope disclosed in the present specification is not limited to the contents of the embodiments, and the contents of Reference Literatures REF1 to REF3 below that are known at the time of application of the present specification are incorporated herein by reference. That is, the contents described in Reference Literatures REF1 to REF3 below are used as a basis for determination on support requirements. For example, even if Quad-Tree Block Structure described in Reference Literature REF2 and Quad Tree Plus Binary Tree (QTBT) Block Structure described in Reference Literature REF3 are not directly defined in the detailed descriptions of the invention, they are within the scope of the present disclosure and meet support requirements for the appended claims. Furthermore, the same applies to, for example, technical terms, such as Parsing, Syntax, and Semantics, and even if the technical terms are not directly defined in the detailed descriptions of the invention, they are within the scope of the present disclosure and meet support requirements for the appended claims.

REF1: Recommendation ITU-T H.264 (April 2017) "Advanced video coding for generic audiovisual services", April 2017

REF2: Recommendation ITU-T H.265, (December 2016) "High efficiency video coding", December 2016

REF3: J. Chen, E. Alshina, G. J. Sullivan, J.-R. Ohm, J. Boyce, "Algorithm Description of Joint Exploration Test Model (JEM7)", JVET-G1001, Joint Video Exploration Team (JVET) of ITU-T SG 16 WP 3 and ISO/IEC JTC 1/SC 29/WG 11 7$^{th}$ Meeting: Torino, IT, 13-21 Jul. 2017

Moreover, in the following, a signal in the YUV420 format will be described as an example unless otherwise specified, and a luminance component may be represented as a Y component and color difference components may be represented as a U component and a V component. However, the technology described below is similarly applicable to signals in other formats, such as the YUV444 format and the YUV422 format. Furthermore, expressions of the luminance component and the color difference components vary depending on target signals, and the technology described below is similarly applicable to a signal in which the luminance component and the color difference components are represented by YCbCr, for example.

Moreover, terms used in the present specification are defined as follows.

A color difference related parameter indicates general parameters related to a color difference. For example, the color difference related parameter may include information related to transform coefficients of color different components, such as transform coefficients of color difference components included in each of Transform Units (TUs) or a flag indicating presence or absence of significant coefficients (non-zero transform coefficients) of the color difference components in each of the TUs. However, the color difference related parameter is not limited to this example, and may be various parameters related to a color difference.

Deblocking filter application necessity indicates whether to apply a deblocking filter. For example, determination on the deblocking filter application necessity indicates determination on whether to apply the deblocking filter. Furthermore, a determination result of the deblocking filter application necessity is a result of the determination on whether to apply the deblocking filter, and the determination result may be information indicating necessity of application or unnecessity of application, for example.

Large block determination indicates determination on whether a determination target block is a large block. In the present specification, the determination target block may be blocks that sandwich a block boundary as will be described later. Further, the large block determination may be performed by comparison between a size of a block (block size) and a predetermined threshold. Meanwhile, a case in which the large block determination is performed and details of the large block determination will be described later.

In addition, hereinafter, explanation will be given in the following order.

1. Overview
   1-1. Existing deblocking filter
   1-2. Overview of technology according to present disclosure
2. Overview of apparatuses
   2-1. Image coding apparatus
   2-2. Image decoding apparatus
3. Deblocking filter
   3-1. Configuration example
   3-2. Flow of processes
   3-3. Modification
4. Hardware configuration example
   5. Conclusion

1. OVERVIEW

[1-1. Existing Technique]

A process related to a deblocking filter in an existing image coding system, such as HEVC, includes an application necessity determination process, a filter strength determination process, and a filtering process (filter application process). In the following, a process related to the existing deblocking filter will be described by using a deblocking filter in HEVC as an example. Meanwhile, in the following, a deblocking filter for color difference components of a decoded image (including an image that is locally decoded at the time of coding) will be mainly explained, and explanation on a deblocking filter for a luminance component of the decoded image will be omitted appropriately.

As the process related to the deblocking filter, the application necessity determination process is firstly performed. The application necessity determination process is a process for determining whether to apply a deblocking filter to a block boundary of a decoded image. Meanwhile, in HEVC, the block boundary is identified based on a block structure of Quad-Tree Block Structure described in Reference Literature REF2. Specifically, an edge that meets a condition the edge is at least one of a Transform Unit (TS) boundary and a Prediction Unit (PU) boundary among edges of a 8×8 pixel block (sample grid), which is a minimum block unit, is identified as the block boundary in HEVC.

The application necessity determination process is performed based on boundary strength (hereinafter, also referred to as bS) of the block boundary. In HEVC, bS is calculated every four lines of the identified block boundary. If the block boundary is a vertical boundary, the above-described lines correspond to rows that are perpendicular to the vertical boundary. Further, if the block boundary is a horizontal boundary, the above-described lines correspond to columns that are perpendicular to the horizontal boundary.

FIG. 1 is a table for explaining calculation of bS in HEVC. As illustrated in FIG. 1, in HEVC, bS is calculated based on whether a condition A that is a condition on intra prediction, a condition B1 that is a condition on a significant coefficient of a Y component, and a condition B2 that is a condition on a motion vector (MV) and a reference picture are true or false (met or not met). With reference to FIG. 1, if the condition A is true, bS is set to 2. Further, if the condition A is false and at least one of the condition B1 and the condition B2 is true, bS is set to 1. Furthermore, if all of the condition A, the condition B1, and the condition B2 are false, bS is set to 0. Meanwhile, the condition A, the condition B1, and the condition B2 illustrated in FIG. 1 are conditions as described below.

Condition A: a coding mode of at least one of Coding Units (CUs) that include pixels of an uppermost line among bS calculation target lines and that sandwich the block boundary is set to an intra prediction mode Condition B1: the block boundary is a TU boundary, and a significant coefficient of a Y component is present in at least one of two TUs that include pixels of an uppermost line among bS calculation target lines and that sandwich the block boundary Condition B2: an absolute value of a difference between MVs is equal to or larger than one pixel, a reference picture for motion compensation is different, or the number of MVs is different between two CUs that include pixels of an uppermost line among bS calculation target lines and that sandwich the block boundary Furthermore, in HEVC, a deblocking filter for a luminance component (Y component) of a decoded image is applicable to a block boundary for which bS that is set as described above is set to 1. Therefore, in HEVC, a result of determination on necessity of application of the deblocking filter to the luminance component of the decoded image may vary depending whether the condition B1 or the condition B2 is met.

Meanwhile, in HEVC, a strong filter with large filter strength and a weak filter with small filter strength are prepared as deblocking filters for the luminance component of the decoded image. If bS is equal to or larger than 1, a process related to the deblocking filter for the luminance component of the decoded image is performed such that an additional application necessity determination process based on an additional condition is performed, and thereafter a filter strength determination process and a filtering process are performed. Details of the above processes are described in Reference literature REF2 above, and therefore, explanation of the processes will be omitted herein.

In contrast, in HEVC, a deblocking filter for color difference components (U component and V component) of the decoded image is applied only to a block boundary for which bS is set to 2. Therefore, as illustrated in FIG. 1, in HEVC, whether the condition B1 or the condition B2 is met does not have an impact on determination on necessity of application of the deblocking filter to the color difference components of the decoded image.

Further, in HEVC, only the weak filter is applicable, as the deblocking filter, to the color difference components of the decoded image. Therefore, the filter strength determination process is not needed for the color difference components of the decoded image, and if bS is set to 2, the weak filter is applied to the color difference components of the decoded image.

Incidentally, as described in Reference Literature REF3 above, in block segmentation using QTBT Block Structure of FVC, a block with a larger size may be selected as compared to block segmentation using Quad-Tree Block Structure of HEVC. If a block size is large in a flat region (region in which a change in a pixel value in the region is small), block distortion is likely to occur. Therefore, in FVS in which a block with a larger size may be selected, if only the weak filter is adopted as the deblocking filter that is applicable to the color difference components of the decoded image similarly to HEVC, noticeable block distortion may remain in the color difference components. In view of the circumstances as described above, it is demanded to improve the deblocking filter for the color difference components of the decoded image.

For example, Non Patent Literature 2 proposes a technique of changing the deblocking filter applicable to the color difference components to two kinds of filters similarly to the deblocking filter applicable to the luminance component, and allowing the strong filter to be applied even to the color difference components. Further, Non Patent Literature 2 describes that the deblocking filter is applicable to the color difference components of the decoded image not only when bS is set to 2, but also when bS is set to 1.

FIG. 2 is a table for explaining calculation of bS in Non Patent Literature 2. As illustrated in FIG. 2, in Non Patent Literature 2, similarly to the example of HEVC illustrated in FIG. 2, bS is calculated based on the condition A, the condition B1, and the condition B2 as described above. However, as described above, in Non Patent Literature 2, the deblocking filter is applicable to the color difference components of the decoded image not only when bS is set to 2, but also when bS is set to 1. Therefore, as illustrated in FIG. 2, in Non Patent Literature 2, a result of determination on necessity of application of the deblocking filter to the color difference components (U component and V component) of the decoded image may vary depending on whether the condition B1 or the condition B2 is met.

In the following, the application necessity determination process, the filter strength determination process, and the filtering process related to the deblocking filter that is applicable to the color difference components of the decoded image in Non Patent Literature 2 will be described with reference to FIG. 3. FIG. 3 is an explanatory diagram illustrating an example of pixels of color difference components (U components and V components) in two blocks Bp and Bq that are adjacent to each other across a vertical block boundary BB. Meanwhile, explanation will be given below by using the vertical boundary as an example, but matters explained below are, of course, similarly applicable to the horizontal boundary. Further, FIG. 3 illustrates an example in which each of the block Bp and the block Bq of the color difference components has a size of 4×4, but matters explained below are similarly applicable to blocks with different sizes.

In the example in FIG. 3, the pixels of the color difference components in the block Bp are denoted by symbols $p_{i,j}$. i is an index of a column and j is an index of a row. The index i of the column is numbered 0, 1, 2, 3 in this order from the column closest to the block boundary BB (from left to right in the figure). The index j of the row is numbered 0, 1, 2, 3 from top to bottom. In contrast, the pixels of the color difference components in the block Bq are denoted by symbols $q_{k,j}$. k is an index of a column and j is an index of a row. The index k of the column is numbered 0, 1, 2, 3 from the column closest to the block boundary BB (from left to right in the figure).

As described above with reference to FIG. 2, after bS is calculated, the application necessity determination process and the filter strength determination process are performed by using three conditions as described below. These processes are performed every two lines of the color difference components in the YUV420 format. For example, in the example illustrated in the FIG. 3, determination on a line L11 and a line L12 and determination on a line L21 and a line L22 are performed separately. Meanwhile, the determination for each of lines is performed using pixels of a determination target line. In the following, the application necessity determination process, the filter strength determination process, and the filtering process on the line L11 and the line L12 will be described as an example.

First, in the application necessity determination process, whether a condition C91 and a condition C92 below are true is determined in sequence.

$$(bS==2\|bS==1\&\&$$
$$(\text{block\_width}>16\&\&\text{block\_height}>16)))$$ 　　　Condition C91:

$$d<\text{beta}$$ 　　　Condition C92:

Meanwhile, in the condition C91 above, block_width and block_height respectively represent a horizontal size and a vertical size of a block (for example, CU) related to a determination target block boundary as illustrated in FIG. 3.

Further, a variable beta in the condition C92 above is an edge determination threshold, and an initial value of the variable beta is given in accordance with a quantization parameter. Furthermore, a value of the variable beta is a parameter in a slice header and may be designated by a user. Moreover, a variable d in the condition C92 above is calculated by Equations (1) to (7) below.

$$dp0 = \text{Abs}(p_{2,0} - 2*p_{1,0} + p_{0,0}) \tag{1}$$

$$dp1 = \text{Abs}(p_{2,1} - 2*p_{1,1} + p_{0,1}) \tag{2}$$

$$dp0 = \text{Abs}(q_{2,0} - 2*q_{1,0} + q_{0,0}) \tag{3}$$

$$dp1 = \text{Abs}(q_{2,1} - 2*q_{1,1} + q_{0,1}) \tag{4}$$

$$dpq0 = dp0 + dq0 \tag{5}$$

$$dpq1 = dp1 + dp1 \tag{6}$$

$$d = dpq0 + dpq1 \tag{7}$$

Meanwhile, the condition C92 above is the same as the condition that is used in the application necessity determination process on the deblocking filter applied to the luminance component in HEVC (hereinafter, referred to as a condition for a luminance component) except that lines to be referred to are different. In the condition for the luminance component, pixels in the first line and the fourth line are referred to, and determination is performed every four lines. In contrast, in the YUV420 format, a pixel density of the color difference components (U components and V components) is a half of a pixel density of the luminance components, and therefore, in the condition C92 above, the pixels in the line L11 that is the first line and the pixels in the line L12 that is the second line are referred to, and determination is performed every two lines.

If at least one of the condition C91 and the condition C92 above is false, the deblocking filter is not applied to the color difference components of the decoded image. In contrast, if both of the condition C91 and the condition C92 above are true, the process proceeds to the filter strength determination process.

In the filter strength determination process, it is determined whether a condition C93 below is true in order to determine which of the strong filter and the weak filter is to be applied.

$$(\text{block\_width}>16\&\&\text{block\_height}>16)$$ 　　　Condition C93:

Meanwhile, in the condition C91 above, block_width and block_height respectively represent a horizontal size and a vertical size of a block related to a determination target block boundary, similarly to block_width and block_height in the condition C91.

If the condition C93 above is true, the strong filter is applied to the color difference components of the decoded image at the target block boundary, and if the condition C93 above is false, the weak filter is applied to the color difference components of the decoded image at the target block boundary.

The strong filter that is applied to the color difference components in Non Patent Literature 2 is the same as the strong filter that is applied to the luminance components in HEVC, and represented by Equations (8) to (13) below.

$$p'_0 = \tag{8}$$

$$\text{Clip3}\big(p_0 - 2*t_c,\ p_0 + 2*t_c,\ (p_2 + 2*p_1 + 2*p_0 + 2^*_{q0+q1} + 4) >> 3\big)$$

$$p'_1 = \text{Clip3}(p_1 - 2*t_c,\ p_1 + 2*t_c,\ (p_2 + p_1 + p_0 + q_0 + 2) >> 2) \tag{9}$$

$$p'_2 = \tag{10}$$

$$\text{Clip3}(p_2 - 2*t_c,\ p_2 + 2*t_c,\ (2*p_3 + 3*p_2 + p_1 + p_0 + q_0 + 4) >> 3)$$

$$q'_0 = \text{Clip3}(q_0 - 2*t_c,\ q_0 + 2*t_c,\ (p_1 + 2p_0 + 2q_0 + 2q_1 + q_2 + 4) >> 3) \tag{11}$$

$$q'_1 = \text{Clip3}(q_1 - 2*t_c,\ q_1 + 2*t_c,\ (p_0 + q_0 + q_1 + q_2 + 2) >> 2) \tag{12}$$

$$q'_2 = \tag{13}$$

$$\text{Clip3}(q_2 - 2*t_c,\ q_2 + 2*t_c,\ (p_0 + q_0 + q_1 + 3*q_2 + 2*q_3 + 4) >> 3)$$

Meanwhile, in Equations (8) to (13) above, $p_i$ and $q_k$ represent pixel values of the color difference components before application of the deblocking filter. Further, $p_i'$ and $q_k'$ represent pixel values of the color difference components after application of the deblocking filter. Here, i and k respectively represent indices of the columns in the block Bp and the block Bq, and indices of the rows are omitted in Equations (8) to (13). Furthermore, $t_C$ is a parameter that is given in accordance with a quantization parameter. Moreover, Clip3(a,b,c) represents a clipping process for clipping a value c in a range of a≤c≤b.

The weak filter that is applied to the color difference components in Non Patent Literature 2 is the same as the weak filter that is applied to the color difference components in HEVC, and therefore, explanation of the weak filter will be omitted herein.

Thus, the processes related to the deblocking filter is applicable to the color difference components of the decoded image in Non Patent Literature 2 have been described above. According to the technique as described above, it is possible to apply the strong filter not only to the luminance component, but also to the color difference components in accordance with conditions.

However, as described above with reference to FIG. 2, the condition B1 that is used for calculation of bS in Non Patent Literature 2 depends on presence or absence of the significant coefficient of the luminance component (Y component) similarly to the case of HEVC, and information on the color difference components (U component and V component) is not used even in other conditions. However, a spatial pattern of the luminance component and a spatial pattern of each of the color difference components do not always coincide with each other. Therefore, if necessity of application of the deblocking filter to the color difference components is determined in accordance with the condition based on the information on the luminance component, there may be a case in which the deblocking filter is not appropriately applied even though block distortion has occurred, and the block distortion may remain.

Further, if bS is set to 1, to cause the condition C91 used for the application necessity determination process in Non Patent Literature 2 to be true, both of the horizontal size and the vertical size of the block related to the determination target block boundary needs to be set to 16 or larger. However, as described in Reference Literature REF3, a shape of the block (for example, CU) in FVC may not only be a square, but also be a rectangle that is not a square. In addition, block distortion is likely to occur depending on a size in a direction perpendicular to the block boundary, rather than a size in the same direction as the block boundary. Therefore, in the application necessity determination process in Non Patent Literature 2, there may be a case in which the deblocking filter is not appropriately applied and block distortion remains depending on the shape of the block.

Furthermore, the strong filter in Non Patent Literature 2 is the same as the strong filter applied in HEVC. In contrast, as described above, a block with a larger size may be selected in FVC as compared to a block selected in block segmentation in HEVC, and therefore, even if the strong filter in Non Patent Literature 2 is applied, there may be a case in which block distortion is not fully reduced.

[1-2. Overview of One Embodiment of Present Disclosure]

Thus, one embodiment of the present disclosure has been conceived with a focus on the circumstances as described above. An image processing apparatus according to one embodiment of the present disclosure performs an application necessity determination process of determining necessity of application of a deblocking filter to color difference components of a decoded image on the basis of boundary strength (bS) that is calculated using a color difference related parameter that is related to a color difference of the decoded image. Hereinafter, an overview of one embodiment of the present disclosure will be described.

FIG. 4 is a table for explaining calculation of bS according to one embodiment. As illustrated in FIG. 4, calculation is performed based on a condition A that is a condition on intra prediction, a condition B1-Y that is a condition on a significant coefficient of a Y component, a condition B1-U that is a condition on a significant coefficient of a U component, a condition B1-V that is a condition on a significant coefficient of a V component, and a condition B2 that is a condition on a MV and a reference picture.

With reference to FIG. 4, if the condition A is true, bS is set to 16. Further, if the condition A is false and the condition B2 is true, bS is set to 1. Furthermore, if the condition A and the condition B2 are false, and if at least one of the condition B1-Y, the condition B1-U, and the condition B1-V is true, bS is set to a value between 2 and 14. Moreover, if all of the condition A, the condition B1-Y, the condition B1-U, the condition B1-V, and the condition B2 are false, bS is set to 0. Meanwhile, the condition A, the condition B1-Y, and the condition B2 illustrated in FIG. 4 are the same as the condition A, the condition B1, the condition B2 that are explained above with reference to FIG. 1. Moreover, a method of calculating bS according to one embodiment will be described in detail later.

In addition, the condition B1-U and the condition B1-V illustrated in FIG. 4 correspond to conditions that are used to determine presence or absence of the significant coefficient of the U component and presence or absence of the significant coefficient of the V, instead of the significant coefficient of the Y component used in the condition B1-Y, and represented as follows. Meanwhile, whether the condition B1-U and the condition B1-V below are true or false may be determined based on a flag (one example of the color difference related parameter) that indicates presence or absence of the significant coefficients of the color difference components in each of the TUs.

Condition B1-U: the block boundary is a TU boundary, and the significant coefficient of the U component is present in at least one of two TUs that include pixels of an uppermost line among bS calculation target lines and that sandwich the block boundary Condition B1-V: the block boundary is a TU boundary, and the significant coefficient of the V component is present in at least one of two TUs that include pixels of an uppermost line among bS calculation target lines and that sandwich the block boundary In the present embodiment, determination on the deblocking filter application necessity with respect to the color difference components of the decoded image is performed based on bS that is calculated using the condition B1-U and the condition B1-V related to the color difference as described above. With this configuration, it is possible to more appropriately apply the deblocking filter to the color difference components.

Furthermore, in the present embodiment, as will be described later, determination on the deblocking filter application necessity with respect to the color difference components of the decoded image is determined further based on a size in a direction perpendicular to the block boundary. With this configuration, it is possible to more appropriately apply the deblocking filter even if the shape of the block is a rectangle that is not a square.

Moreover, in the present embodiment, as will be described later, a strong filter with larger strength (with stronger low pass characteristics) than the strong filter described in Non Patent Literature 2 may be applied to the color difference components of the decoded image. Furthermore, to more appropriately apply the strong filter as described above, in the present embodiment, filter strength is determined by a different method from a method used in the filter strength determination process described in Non Patent Literature 2. With this configuration, it is possible to further reduce block distortion.

Thus, the overview of one embodiment of the present disclosure has been described above. In the following, configurations and operation of the present embodiment for realizing the above-described effects will be sequentially described in detail.

2. SCHEMATIC CONFIGURATION OF APPARATUS

First, a schematic configuration of an exemplary apparatus to which the technology disclosed in the present specification is applicable will be described with reference to FIG. 5 and FIG. 6. The technology disclosed in the present specification is applicable to, for example, an image coding apparatus and an image decoding apparatus.

[2-1. Image coding apparatus]

Figure 5:
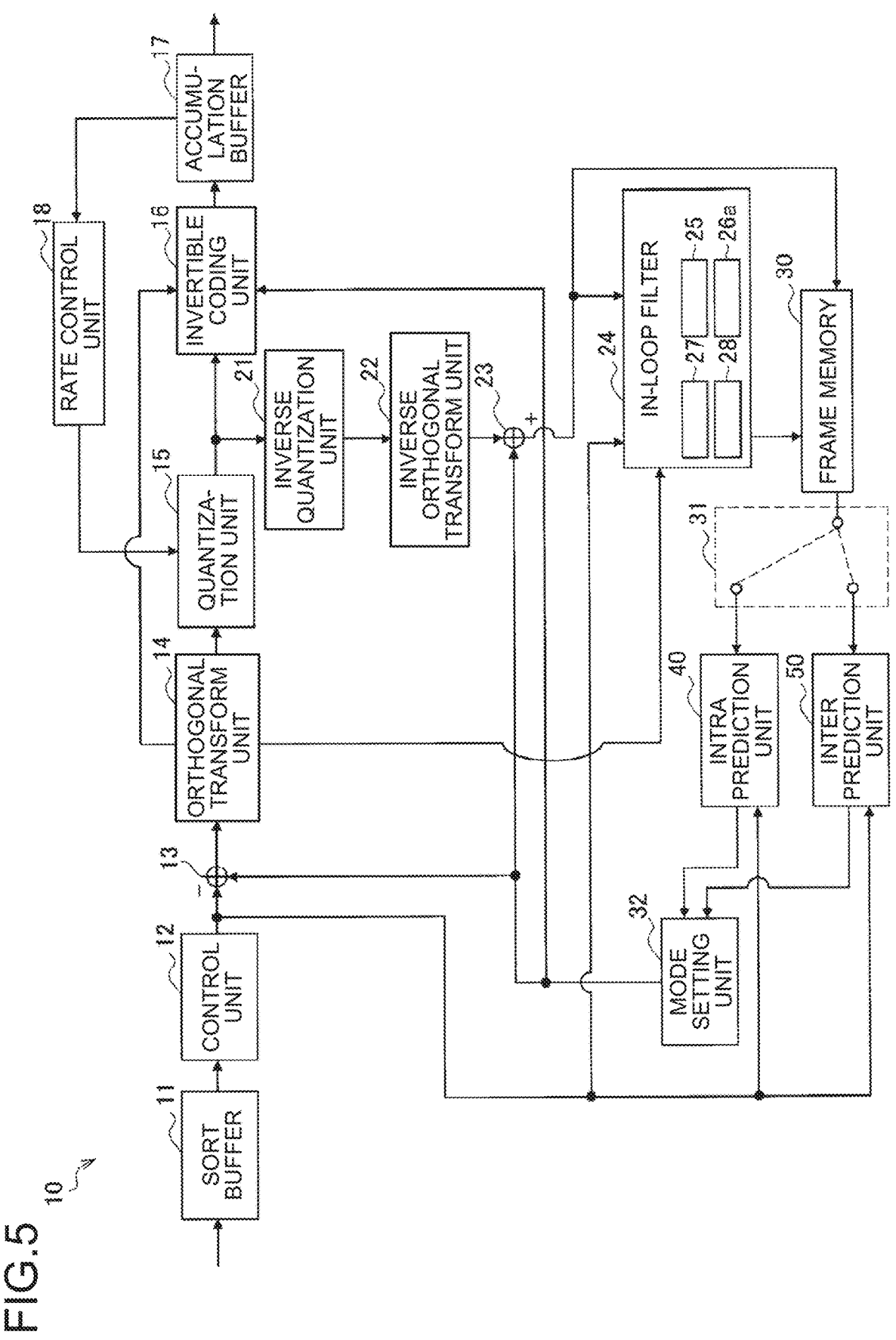
FIG. 5 is a block diagram illustrating an example of a configuration of an image coding apparatus 10 as one mode of an image processing apparatus according to one embodiment.
Figure 6:
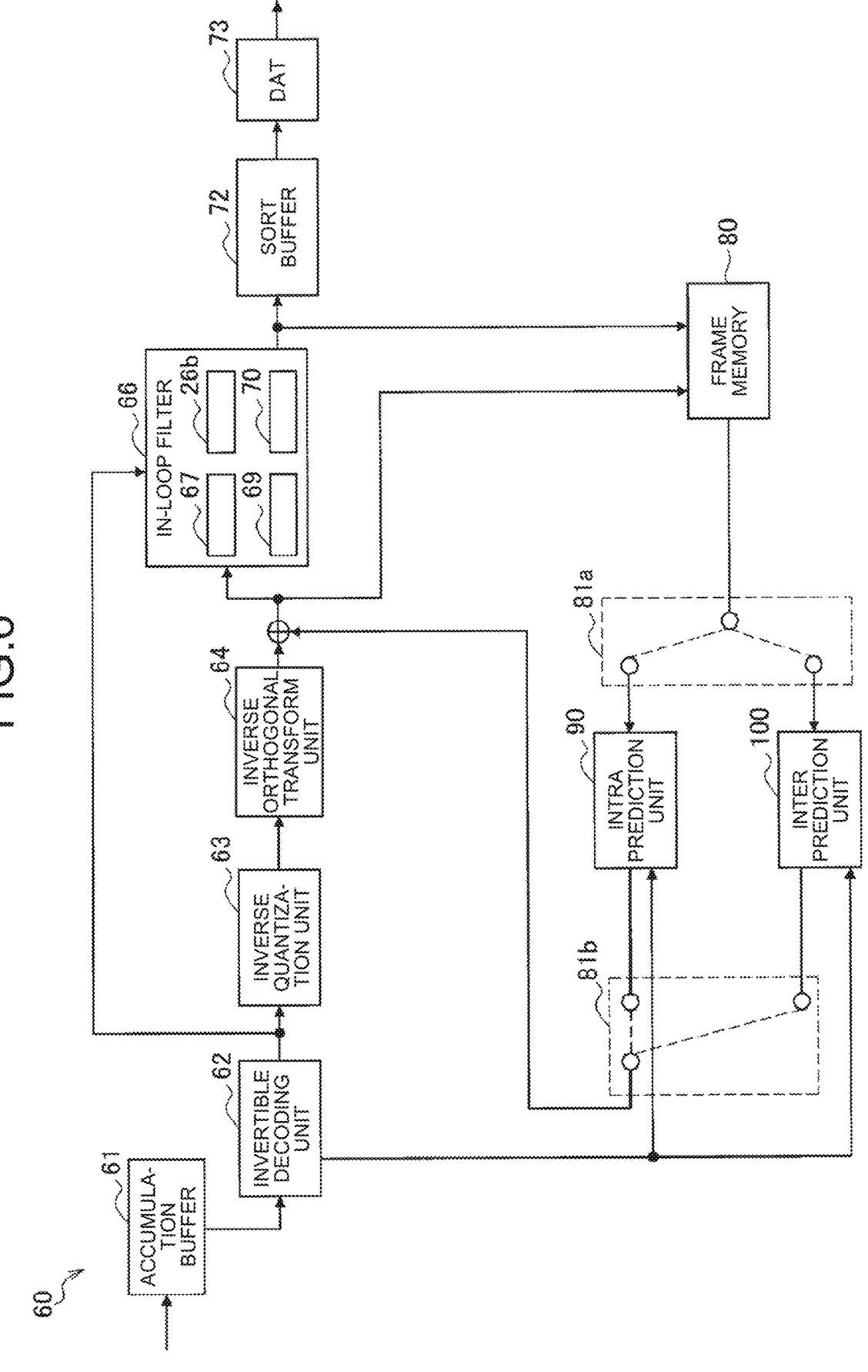
FIG. 6 is a block diagram illustrating an example of a configuration of an image decoding apparatus 60 as one mode of the image processing apparatus according to one embodiment.

FIG. 5 is a block diagram illustrating an example of a configuration of an image coding apparatus 10 as one mode of the image processing apparatus according to one embodiment of the present disclosure.

With reference to FIG. 5, the image coding apparatus 10 includes a sort buffer 11, a control unit 12, a subtraction unit 13, an orthogonal transform unit 14, a quantization unit 15, an invertible coding unit 16, an accumulation buffer 17, an inverse quantization unit 21, an inverse orthogonal transform unit 22, an addition unit 23, an in-loop filter 24, a frame memory 30, a switch 31, a mode setting unit 32, an intra prediction unit 40, and an inter prediction unit 50.

The sort buffer 11 sorts a series of images constituting a video to be coded, in accordance with a Group of Pictures (GOP) structure related to a coding process. The sort buffer 11 outputs the sorted image to the control unit 12, the subtraction unit 13, the intra prediction unit 40, and the inter prediction unit 50.

The control unit 12 segments an image into blocks in a processing unit on the basis of an outside or a block size of a processing unit that is designated in advance. Through the block segmentation performed by the control unit 12, a CU of Quad-Tree Block Structure or Quad Tree Plus Binary Tree (QTBT) Block Structure may be formed as the processing unit. Further, the control unit 12 determines a parameter related to the coding process on the basis of, for example, Rate-Distortion Optimization (RDO). The determined parameter is supplied to each of the units.

The subtraction unit 13 calculates a prediction error that is a difference between an image input from the sort buffer 11 and a predicted image, and outputs the calculated prediction error to the orthogonal transform unit 14.

The orthogonal transform unit 14 performs an orthogonal transform process on each of one or more transform blocks (TUs) that are set in each domain. The orthogonal transform in this case may be, for example, a discrete cosine transform or a discrete sine transform. More specifically, the orthogonal transform unit 14 transforms the prediction error input from the subtraction unit 13 from an image signal in a spatial domain to a transform coefficient in a frequency domain for each of transform blocks. Then, the orthogonal transform unit 14 outputs the transform coefficient to the quantization unit 15.

Furthermore, the orthogonal transform unit 14 may generate a flag indicating presence or absence of a significant coefficient in each of the TUs for each of the components (for each of the Y component, the U component, and the V component) on the basis of the transform coefficient obtained through the orthogonal transform, and output the flags to the invertible coding unit 16 and the in-loop filter 24. Meanwhile, the flag indicating presence or absence of the significant coefficient of the U component in each of the TUs and the flag indicating presence or absence of the significant coefficient of the V component in each of the TUs, which are generated by the orthogonal transform unit 14, are included in the color difference related parameter.

The transform coefficient that is input from the orthogonal transform unit 14 and a rate control signal that is obtained from a rate control unit 18 to be described later are supplied to the quantization unit 15. The quantization unit 15 quantizes the transform coefficient and outputs the quantized transform coefficient (hereinafter, also referred to as quantized data) to the invertible coding unit 16 and the inverse quantization unit 21. Further, the quantization unit 15 changes a quantization scale on the basis of the rate control signal obtained from the rate control unit 18, and changes a bit rate of the quantized data input to the invertible coding unit 16.

The invertible coding unit 16 encodes the quantized data input from the quantization unit 15, and generates a coded stream. Further, the invertible coding unit 16 encodes various parameters that are referred to by a decoder, and inserts the coded parameters to the coded stream. The parameters encoded by the invertible coding unit 16 may include the parameter determined by the control unit 12 as described above.

Furthermore, the parameters encoded by the invertible coding unit 16 may include the color difference related parameter. The color difference related parameter encoded by the invertible coding unit 16 includes, for example, the flag indicating presence or absence of the significant coefficient of the U component in each of the TUs and the flag indicating presence or absence of the significant coefficient of the V component in each of the TUs, which are input from the orthogonal transform unit 14 as described above. The invertible coding unit 16 outputs the generated coded stream to the accumulation buffer 17.

The accumulation buffer 17 temporarily accumulates the coded stream input from the invertible coding unit 16, by using a storage medium, such as a semiconductor memory. Then, the accumulation buffer 17 outputs the accumulated coded stream to a transmission unit (for example, a communication interface, a connection interface for a peripheral device, or the like) (not illustrated) at a rate corresponding to a bandwidth of a transmission path.

The rate control unit 18 monitors a free space of the accumulation buffer 17. Then, the rate control unit 18 generates a rate control signal in accordance with the free space of the accumulation buffer 17, and outputs the generated rate control signal to the quantization unit 15. For example, if the free space of the accumulation buffer 17 is small, the rate control unit 18 generates a rate control signal for reducing the bit rate of the quantized data. Further, for example, if the free space of the accumulation buffer 17 is adequately large, the rate control unit 18 generates a rate control signal for increasing the bit rate of the quantized data.

The inverse quantization unit 21, the inverse orthogonal transform unit 22, and the addition unit 23 constitute a local decoder. The local decoder has a role to locally decode a decoded image from coded data.

The inverse quantization unit 21 inversely quantizes the quantized data using the same quantization parameter as that used by the quantization unit 15, and restores the transform coefficient. Then, the inverse quantization unit 21 outputs the restored transform coefficient to the inverse orthogonal transform unit 22.

The inverse orthogonal transform unit 22 performs an inverse orthogonal transform process on the transform coefficient input from the inverse quantization unit 21, and restores the prediction error. Then, the inverse orthogonal transform unit 22 outputs the restored prediction error the addition unit 23.

The addition unit 23 adds the restored prediction error that is input from the inverse orthogonal transform unit 22 and the predicted image that is input from the intra prediction unit 40 or the inter prediction unit 50, and generates a decoded image (restored image). Then, the addition unit 23 outputs the generated decoded image to the in-loop filter 24 and the frame memory 30.

The in-loop filter 24 applies a series of in-loop filters to improve image quality of the decoded image. For example, as described in "2.5. In-loop filtering" in Reference Literature REF3, four in-loop filters such as a bilateral filter, a deblocking filter, an adaptive offset filter, and an adaptive loop filter may be applied in this order. The in-loop filter 24 illustrated in FIG. 5 includes, for example, a bilateral filter 25, a deblocking filter 26a, an adaptive offset filter 27, and an adaptive loop filter 28, and the four in-loop filters as described above are applied in sequence. However, the configuration of the in-loop filter 24 is not limited to this example, and which of the four in-loop filters is applied and the order of application may appropriately be selectable. Meanwhile, the deblocking filter 26a will be described in detail later.

The in-loop filter 24 outputs the decoded image to which the in-loop filters are applied to the frame memory 30.

The frame memory 30 stores a decoded image which is input from the addition unit 23 and for which filtering is not yet performed and a decoded image which is input from the in-loop filter 24 and to which the in-loop filters are applied, by using a storage medium.

The switch 31 reads, from the frame memory 30, a decoded image which is used for intra prediction and for which filtering is not yet performed, and supplies the read decoded image as a reference image to the intra prediction unit 40. Further, the switch 31 reads, from the frame memory 30, a decoded image which is used for inter prediction and for which filtering is performed, and supplies the read decoded image as a reference image to the inter prediction unit 50.

The mode setting unit 32 sets a predicted coding mode for each of blocks on the basis of a comparison between costs input from the intra prediction unit 40 and the inter prediction unit 50. As for a block for which an intra prediction mode is set, the mode setting unit 32 outputs the predicted image generated by the intra prediction unit 40 to the subtraction unit 13 and the addition unit 23, and outputs information on the intra prediction to the invertible coding unit 16. Further, as for a block for which an inter prediction mode is set, the mode setting unit 32 outputs the predicted image generated by the inter prediction unit 50 to the subtraction unit 13 and the addition unit 23, and outputs information on the inter prediction to the invertible coding unit 16.

The intra prediction unit 40 performs an intra prediction process on the basis of an original image and a decoded image. For example, the intra prediction unit 40 evaluates a cost based on a prediction error and an amount of coding that occurs, for each of candidate prediction modes included in a search range. Subsequently, the intra prediction unit 40 selects a prediction mode at the minimum cost as an optimal prediction mode. Furthermore, the intra prediction unit 40 generates a predicted image in accordance with the selected optimal prediction mode. Then, the intra prediction unit 40 outputs information on intra prediction including prediction mode information indicating the optimal prediction mode, a corresponding cost, and the predicted image, to the mode setting unit 32.

The inter prediction unit 50 performs an inter prediction process (motion compensation) on the basis of the original image and the decoded image. For example, the inter prediction unit 50 evaluates a cost based on the prediction error and the amount of coding that occurs, for each of candidate prediction modes included in a certain search range. Subsequently, the inter prediction unit 50 selects a prediction mode at the minimum cost, that is, a prediction mode at the highest compression rate, as an optimal prediction mode. Furthermore, the inter prediction unit 50 generates a predicted image in accordance with the selected optimal prediction mode. Then, the inter prediction unit 50 outputs information on inter prediction, a corresponding cost, and the predicted image to the mode setting unit 32.

[2-2. Image Decoding Apparatus]

Next, decoding of data that is encoded as described above will be described. FIG. 6 is a block diagram illustrating an example of a configuration of an image decoding apparatus

60 as one mode of the image processing apparatus according to the present embodiment. With reference to FIG. 6, an accumulation buffer 61, an invertible decoding unit 62, an inverse quantization unit 63, an inverse orthogonal transform unit 64, an addition unit 65, an in-loop filter 66, a sort buffer 72, a Digital to Analogue (D/A) conversion unit 73, a frame memory 80, selectors 81a and 81b, an intra prediction unit 90, and an inter prediction unit 100 are included.

The accumulation buffer 61 temporarily stores a coded stream that is received from the image coding apparatus 10 via a transmission unit (for example, a communication interface, a connection interface for a peripheral device, or the like) (not illustrated), by using a storage medium.

The invertible decoding unit 62 decodes the coded stream input from the accumulation buffer 61 in accordance with a coding system that has been used for coding, and generates quantized data. The invertible decoding unit 62 outputs the generated quantized data to the inverse quantization unit 63.

Further, the invertible decoding unit 62 parses various parameters from the coded stream. The parameters parsed by the invertible decoding unit 62 may include, for example, information on intra prediction and information on inter prediction. The invertible decoding unit 62 outputs the information on the intra prediction to the intra prediction unit 90. Further, the invertible decoding unit 62 outputs the information on the inter prediction to the inter prediction unit 100.

Further, the parameters parsed by the invertible decoding unit 62 may include the color difference related parameter. The invertible decoding unit 62 outputs the color difference related parameter to the in-loop filter 66. Meanwhile, the color difference related parameter parsed by the invertible decoding unit 62 includes, for example, the flag indicating presence or absence of the significant coefficient of the U component in each of the TUs and the flag indicating presence or absence of the significant coefficient of the V component in each of the TUs as described above.

The inverse quantization unit 63 inversely quantizes the quantized data input from the invertible decoding unit 62 through the same quantization step as used for coding, and restores the transform coefficient. The inverse quantization unit 63 outputs the restored transform coefficient to the inverse orthogonal transform unit 64.

The inverse orthogonal transform unit 64 performs inverse orthogonal transform on the transform coefficient input from the inverse quantization unit 63, in accordance with an orthogonal transform system that has been used for coding, and generates a prediction error. The inverse orthogonal transform unit 64 outputs the generated prediction error to the addition unit 65.

The addition unit 65 adds the prediction error input from the inverse orthogonal transform unit 64 and the predicted image input from a selector 71b, and generates decoded image. Then, the addition unit 65 outputs the generated decoded image to the in-loop filter 66 and the frame memory 80.

The in-loop filter 66 applies a series of in-loop filters to improve image quality of the decoded image. For example, as described in "2.5. In-loop filtering" in Reference Literature REF3, four in-loop filters such as a bilateral filter, a deblocking filter, an adaptive offset filter, and an adaptive loop filter may be applied in this order. The in-loop filter 66 illustrated in FIG. 6 includes, for example, a bilateral filter 67, a deblocking filter 26b, an adaptive offset filter 69, and an adaptive loop filter 70, and the four in-loop filters as described above are applied in sequence. However, the configuration of the in-loop filter 66 is not limited to this example, and which of the four in-loop filters is applied and the order of application may appropriately be selectable. Meanwhile, the deblocking filter 26b will be described in detail later.

The in-loop filter 66 outputs the decoded image to which the in-loop filters are applied to the sort buffer 72 and the frame memory 80.

The sort buffer 72 sorts images input from the in-loop filter 66, and generates a series of chronological images. Then, the sort buffer 72 outputs the generated images to the D/A conversion unit 73.

The D/A conversion unit 73 converts the images, which are in a digital format and input from the sort buffer 72, into image signals in an analog format. Then, the D/A conversion unit 73 outputs the analog image signals to, for example, a display (not illustrated) that is connected to the image decoding apparatus 60, so that a video is displayed.

The frame memory 80 stores a decoded image which is input from the addition unit 65 and for which filtering is not yet performed and a decoded image which is input from the in-loop filter 66 and to which the in-loop filters are applied, by using a storage medium.

The selector 81a switches between the intra prediction unit 90 and the inter prediction unit 100 as an output destination of an image from the frame memory 80, for each of the blocks in the image in accordance with the prediction mode information acquired by the invertible decoding unit 62. For example, if the intra prediction mode is designated, the selector 81a outputs, as a reference image, a decoded image which is supplied from the frame memory 80 and for which filtering is not yet performed to the intra prediction unit 90. Further, if the inter prediction mode is designated, the selector 81a outputs, as a reference image, a decoded image for which filtering is performed to the inter prediction unit 100.

The selector 81b switches between the intra prediction unit 90 and the inter prediction unit 100 as an output source of a predicted image to be supplied to the addition unit 65, in accordance with the prediction mode information acquired by the invertible decoding unit 62. For example, if the intra prediction mode is designated, the selector 81b supplies the predicted image output from the intra prediction unit 90 to the addition unit 65. Further, if the inter prediction mode is designated, the selector 81b supplies the predicted image output from the inter prediction unit 100 to the addition unit 65.

The intra prediction unit 90 performs the intra prediction process based on the information on the intra prediction input from the invertible decoding unit 62 and the reference image from the frame memory 80, and generates a predicted image. Then, the intra prediction unit 90 outputs the generated predicted image to the selector 81b.

The inter prediction unit 100 performs the inter prediction process based on the information on the inter prediction input from the invertible decoding unit 62 and the reference image from the frame memory 80, and generates a predicted image. Then, the inter prediction unit 100 outputs the generated predicted image to the selector 81b.

3. DEBLOCKING FILTER

[3-1. Configuration Example of Deblocking Filter]

In this section, an example of configurations of the deblocking filter 26a of the image coding apparatus 10 illustrated in FIG. 5 and the deblocking filter 26b of the image decoding apparatus 60 illustrated in FIG. 6 will be described. Meanwhile, the configurations of the deblocking filter 26a and the deblocking filter 26b may be the same. Therefore, in the following description, if the deblocking filter 26a and the deblocking filter 26b need not specifically be distinguished from each other, they will collectively be referred to as a deblocking filter 26.

As described above, the deblocking filter 26 according to the present embodiment determines deblocking filter application necessity with respect to color difference components of a decoded image based on bS that is calculated using the color difference related parameter related to a color difference. Further, as described above, the deblocking filter 26 according to the present embodiment determines the deblocking filter application necessity with respect to the color difference components of the decoded image further based on a size in a direction perpendicular to the block boundary. Moreover, as described above, the deblocking filter 26 according to the present embodiment may apply a strong filter with larger strength (with stronger low pass characteristics) than the strong filter described in Non Patent Literature 2 to the color difference components of the decoded image. Furthermore, to more appropriately apply the strong filter as described above, in the present embodiment, filter strength is determined by a different method from a method used in the filter strength determination process described in Non Patent Literature 2. Meanwhile, in the following, functions of the deblocking filter 26 related to the deblocking filter applied to the color difference components of the decoded image will be mainly described, and functions of the deblocking filter 26 related to the deblocking filter applied to the luminance component will appropriately be omitted.

FIG. 7 is a block diagram illustrating an example of a detailed configuration of the deblocking filter 26 according to the present embodiment. With reference to FIG. 7, the deblocking filter 26 includes a boundary strength calculation unit 261, a determination unit 263, and a filtering unit 269.

(1) Boundary Strength Calculation Unit

The boundary strength calculation unit 261 adopts a block boundary of a decoded image as a target, and calculate boundary strength (bS) using the color difference related parameter related to a color difference. If a signal in the YUV420 format is adopted as a target, the boundary strength calculation unit 261 calculates bS in units of four lines of the luminance components of the decoded image, that is, in units of two lines of the color difference components of the decoded image.

In the present embodiment, the color difference related parameter used by the boundary strength calculation unit 261 for calculation of bS includes the flag indicating presence or absence of the significant coefficient of the U component in each of the TUs and the flag indicating presence or absence of the significant coefficient of the V component in each of the TUs. As illustrated in FIG. 7, the flag indicating presence or absence of the significant coefficient of each of the components (Y component, U component, and V component) in each of the TUs is input to the boundary strength calculation unit 261 from the orthogonal transform unit 14 or the invertible decoding unit 62.

The boundary strength calculation unit 261 calculates bS based on the condition A, the condition B1-Y, the condition B1-U, the condition B1-V, and the condition B2 that are explained above with reference to FIG. 4. That is, the boundary strength calculation unit 261 calculates bS on the basis of whether the significant coefficients of the color difference components are present in TUs that sandwich the block boundary for which bS is to be calculated. Furthermore, the boundary strength calculation unit 261 according to the present embodiment may calculate bS by independently determining whether the significant coefficient of each of the Y component, the U component, and the V component is present in the TUs that sandwich the block boundary for which bS is to be calculated. With this configuration, it is possible to calculate bS that is more suitable for the U component and the V component as compared to calculation of bS based on whether the significant coefficient of the Y component is present as explained above with reference to FIG. 2, so that it is possible to more appropriately apply the deblocking filter.

With reference to FIG. 8, calculation of bS by the boundary strength calculation unit 261 will be described in detail. FIG. 8 is a table illustrating an example of bS calculated by the boundary strength calculation unit 261. bS calculated by the boundary strength calculation unit 261 may be represented by a plurality of bits. In the example illustrated in FIG. 8, bS is represented by 5 bits. Further, bS may be calculated such that the plurality of bits include at least one bit corresponding to each of the Y component, the U component, and the V component. With this configuration, when the determination unit 263 to be described later determines the deblocking filter application necessity based on bS, it is possible to easily perform the determination by referring to the bits of corresponding bS for each of determination target components.

Furthermore, the boundary strength calculation unit 261 may calculate bS such that each of the bits included in bS corresponds to true or false of each of conditions. In the example illustrated in FIG. 8, bS is calculated such that if each of the conditions is true, the bit corresponding to each of the conditions is set to 1, and if each of the conditions is false, the bit corresponding to each of the conditions is set to 0. Moreover, in the example illustrated in FIG. 8, bS is represented by 5 bits, where the fifth bit of bS corresponds to the condition A on the intra prediction, the fourth bit of bS corresponds to the condition B1-Y on the significant coefficient of the Y component, the third bit of bS corresponds to the condition B1-U on the significant coefficient of the U component, the second bit of bS corresponds to the condition B1-V on the significant coefficient of the V component, and the first bit of bS corresponds to the condition B2 on the MV and the reference picture. However, correspondence between each of the bits of bS and each of the conditions is not limited to the example as illustrated in FIG. 8. For example, order of the fourth bit, the third bit, and the second bit of bS respectively corresponding to the Y component, the U component, and the V component may be interchanged with one another.

(2) Determination Unit

The determination unit 263 includes, as illustrated in FIG. 7, an application necessity determination unit 265 that determines the deblocking filter application necessity with respect to the color difference components of the decoded image, and a filter strength determination unit 267 that determines filter strength of the deblocking filter that is applied to the color difference components of the decoded image. In the following, functions of the application necessity determination unit 265 and the filter strength determination unit 267 will be described in sequence.

Meanwhile, in the following explanation, determination on the deblocking filter application necessity with respect to the color difference components of the decoded image and determination on filter strength will be mainly described, and explanation of determination on the luminance component will appropriately be omitted. Further, the application necessity determination unit 265 and the filter strength determination unit 267 according to the present embodiment determine the deblocking filter application necessity and the filter strength separately for each of the U component and the V component.

The application necessity determination unit 265 adopts the block boundary of the decoded image as a target, and determines the deblocking filter application necessity with respect to the color difference components of the decoded image based on boundary strength (bS) that is calculated by the boundary strength calculation unit 261 as described above.

Further, the application necessity determination unit 265 may determine the deblocking filter application necessity with respect to the color difference components of the decoded image further based on block sizes of blocks that sandwich the block boundary. Meanwhile, in the following, determination based on the block sizes may be referred to as large block determination. Furthermore, the application necessity determination unit 265 need not always perform the large block determination on all of block boundaries, but may determine whether to perform the large block determination in accordance with bS. A case in which the large block determination is performed and details of the large block determination will be described later.

The application necessity determination unit 265 according to the present embodiment determines the deblocking filter application necessity through determination on a condition C1 and a condition C2 below.

$$(bS==16\|(\text{condition } C11\&\&\text{condition}C12)) \qquad \text{Condition C1:}$$

$$d<\text{beta} \qquad \text{Condition C2:}$$

A condition C11 in the condition C1 above is a condition for determining whether to perform the large block determination, and a condition C12 is a condition related to the large block determination. If bS is 16, that is, if the condition A on the intra prediction is met, the condition C1 can be determined as true without a need to perform the large block determination. Therefore, the condition C11 for determining whether to perform the large block determination may be true if bS has a value related to the inter prediction. Meanwhile, by determining that the condition C1 is true while skipping the large block determination if bS is 16 as described above, it is possible to reduce a processing amount related to the large block determination.

Furthermore, if the condition C11 in the condition C1 is false, the condition C1 is determined as false without performing determination on the condition C12 (large block determination). With this configuration, it is possible to reduce the processing amount related to the large block determination.

The condition C11 may be true if a condition on the significant coefficient of each of the components or the condition B2 described above is true. That is, the condition C11 may vary depending on a determination target component. For example, the condition C11 may be a condition such as a condition C11-U below if the U component is adopted as a determination target, and the condition C11 may be a condition such as a condition C11-V below if the V component is adopted as a determination target.

$$(bS\&0x04\|bS\&0x01) \qquad \text{Condition C11-U:}$$

$$(bS\&0x02\|bS\&0x01) \qquad \text{Condition C11-V:}$$

Moreover, the application necessity determination unit 265 performs the large block determination based on sizes of the blocks that sandwich the block boundary, in a direction perpendicular to the block boundary. With this configuration, if the shapes of the blocks are rectangles that are not squares, it is possible to determine necessity of application of the deblocking filter based on the sizes in the direction perpendicular to the block boundary, where the sizes in this direction are likely to have impacts on occurrence of block distortion.

Furthermore, the application necessity determination unit 265 may perform the large block determination based on whether the sizes of the blocks sandwiching the block boundary in the direction perpendicular to the block boundary is larger than a predetermined threshold. The threshold used for the large block determination is not limited, but may be, for example, 16. If the sizes in the direction perpendicular to the block boundary are small, in particular, equal to or smaller than 16, block noise is less likely to be visible, and therefore, with this configuration, it is possible to avoid application of an unnecessary deblocking filter. For example, a condition C12 on the large block determination may be a condition below.

$$(\text{EDGE\_}VER\&\&\text{block\_width}>16)\|$$
$$(\text{EDGE\_}HOR\&\&\text{block\_height}>16) \qquad \text{Condition C12:}$$

Meanwhile, in the condition C12 above, EDGE_VER indicates that a determination target block boundary is a vertical boundary, and EDGE_HOR indicates that the determination target block boundary is a horizontal boundary.

Furthermore, the condition C2 above is the same as the condition C92 described above, and therefore, explanation thereof will be omitted here. Meanwhile, determination on the condition C2 above is performed if the condition C1 is true, and, if the condition C1 is false, it is determined that the deblocking filter is not to be applied without performing determination on the condition C2. The determination on the condition C2 needs a process for calculating the variable d as indicated by Equations (1) to (7) above and a processing amount is larger than that of the determination on the condition C1; therefore, by performing the determination on the condition C2 after the determination on the condition C1, it is possible to reduce a processing amount.

Moreover, the filter strength determination unit 267 further determines the filter strength of the deblocking filter that is applied to the color difference components of the decoded image, after determination on the deblocking filter application necessity based on the condition C1 and the condition C2 as described above. The deblocking filter applicable in the present embodiment may include two kinds of filter, such as a weak filter with smaller strength and a strong filter with larger strength, as will be described later. Then, the filtering unit 269 to be described later applies any of the weak filter and the strong filter in accordance with the filter strength determined by the filter strength determination unit 267.

The filter strength determination unit 267 determines the filter strength if it is determined that the deblocking filter is to be applied. By performing the determination on the filter strength after the determination on the deblocking filter application necessity, it is possible to reduce a process related to the determination on the filter strength.

Furthermore, the filter strength determination unit 267 determines the filter strength based on waveforms of the color difference components of a pixel that is located in the vicinity of the block boundary. In the following, determination based on the waveforms will be described. The filter strength determination unit 267 determines the filter strength using a condition C3 below, which is based on waveforms.

(condition *C*31&&condition *C*32&&condition *C*33) Condition C3:

Condition *C*31: $|p_3 - p_0| + |q_3 - q_0| <$ (beta >> 3)

Condition *C*32: $|p_2 - 2 * p_1 + p_0| + |q_2 - 2 * q_1 + q_0| <$ (beta >> 2)

Condition *C*33: $|p_0 - q_0| < ((t_c^* 5 + 1) >> 1)$

The filter strength determination unit 267 performs determination on the condition C3 above with respect to pixels that are included in the two lines among pixels that are located in the vicinity of the block boundary. The condition C31, the condition C32, and the condition C33 used in the condition C3 above are determined for each of the lines. Meanwhile, $p_i$, $q_k$, $p_i'$, $q_k'$, beta, and $t_C$ described in the condition C31, the condition C32, and the condition C33 are already described above, and therefore explanation thereof will be omitted here.

The condition C31, the condition C32, and the condition C33 are conditions that are determined using pixels included in each of the lines. More specifically the condition C31 is a condition on flatness of the color difference components of the pixels included in each of the lines in the block. Further, the condition C32 is a condition on determination on continuity of the color difference components of the pixels included in each of the lines in the block. Moreover, the condition C33 is a condition on a gap (difference) of the color difference components of the pixels included in each of the lines between the blocks, and in particular, a condition for determining a gap between the blocks by using pixel values adjacent to the block boundary.

If the condition C31 is true, the flatness of the waveforms of the color difference components in each of the blocks is high. Further, if the condition C32 is true, the continuity of the waveforms of the color difference components in each of the blocks is high. Furthermore, if the condition C32 is true, the waveforms of the color difference components have a large gap at the block boundary.

As described above, the condition C3 is determined as true if all of the condition C31, the condition C32, and the condition C33 above are true. Further, the filter strength determination unit 267 determines the condition C3 above for each of the lines. However, as described above, the filter strength is determined in units of two lines. That is, the filter strength is determined such that if the condition C3 above is true in both of two successive lines, the strong filter is applied to the two lines, and if the condition C3 above is false in both of the two successive lines, the weak filter is applied to the two lines.

(3) Filtering Unit

The filtering unit 269 applies the deblocking filter to the color difference components of pixels that are located in the vicinity of the block boundary, on the basis of a determination result of the deblocking filter application necessity performed by the application necessity determination unit 265. Further, as described above, the filtering unit 269 applies the weak filter or the strong filter as the deblocking filter in accordance with the filter strength determined by the filter strength determination unit 267.

The weak filter that is applied to the color difference components by the filtering unit 269 according to the present embodiment may be the same as the weak filter that is applied to the color difference components of the decoded image in Non Patent Literature 2 or HEVC as described above, for example. In contrast, the strong filter that is applied to the color difference components by the filtering unit 269 according to the present embodiment may be different from the strong filter that is applied to the color difference components in Non Patent Literature 2 (the strong filter applied to the luminance component in HEVC). Hereinafter, an example of the strong filter that is applied to the color difference components in the present embodiment will be described.

A coefficient of the strong filter that is applied to the color difference components in the present embodiment may be set to 2 at the center position of an application target region for the strong filter and may be set to 1 at other positions. Further, the filtering unit 269 may adopt three pixels on both sides from the block boundary as the application target region for the strong filter, and apply the strong filter to the color difference components included in the application target region by using three pixels on both sides from the center position of the application target range as reference pixels. For example, a strong filter for which the center position of the application target range is denoted by $p_0$ is represented by Equation (14) below.

$$p_0' = \text{Clip3}(p_0 - w * t_c, \ p_0 + w * t_c, \tag{14}$$
$$((p_3 + p_2 + p_1 + 2 * p_0 + q_0 + q_1 + q_2 + 4) >> 3))$$

Meanwhile, w in Equation (14) above is a weight that is appropriately set, and may be set to 1 or 2, for example. Further, Clip3(a,b,c) represents a clipping process for clipping the value c in the range of a≤c≤b as described above.

By applying the strong filter as described above, it is possible to apply a deblocking filter that is stronger than the strong filter that is applied to the color difference components in Non Patent Literature 2 as described above.

Meanwhile, if the center position of the application target range for the strong filter is the second pixel or the third pixel from the block boundary, the reference pixels include pixels that is separated by five pixels or more from the block boundary. However, pixels that are separated by five pixels or more from the block boundary are not used for determination on the filter strength and may be unsuitable for use as the reference pixels. Therefore, the filtering unit 269 may perform padding on a pixel value of the fourth pixel from the block boundary, instead of pixels that are separated by five pixels or more from the block boundary, and use the pixel value as a pixel value of the reference pixel.

For example, the strong filter for which the center position of the application target range is denoted by $p_1$ is represented by Equation (15) below.

$$p_1' = \text{Clip3}(p_1 - w * t_c, \ p_1 + w * t_c, \tag{15}$$
$$((p_4 + p_3 + p_2 + 2 * p_1 + p_0 + q_0 + q_1 + 4) >> 3))$$
$$= \text{Clip3}(p1 - w * t_c, \ p_1 + w * t_c,$$
$$((p_3 + p_3 + p_2 + 2 * p_1 + p_0 + q_0 + q_1 + 4) >> 3))$$
$$= \text{Clip3}(p_1 - w * t_c, \ p_1 + w * t_c,$$
$$((2 * p_3 + p_2 + 2 * p_1 + p_0 + q_0 + q_1 + 4) >> 3))$$

Similarly, the strong filter for which the center position of the application target range is denoted by $p_2$ is represented by Equation (16) below.

$$p'_2 = \text{Clip3}(p_2 - w * t_c, \ p_2 + w * t_c, \quad\quad (16)$$

$$((p_5 + p_4 + p_3 + 2 * p_2 + p_1 + p_0 + q_0 + 4) >> 3))$$

$$= \text{Clip3}(p_2 - w * t_c, \ p_2 + w * t_c,$$

$$((p_3 + p_3 + p_3 + 2 * p_2 + p_1 + p_0 + q_0 + 4) >> 3))$$

$$= \text{Clip3}(p_2 - w * t_c, \ p_2 + w * t_c,$$

$$((3 * p_3 + 2 * p_2 + p_1 + p_0 + q_0 + 4) >> 3))$$

Further, similarly, the strong filters for which the center positions of the application target ranges are denoted by $q_0$ to $q_3$ are represented by Equations (17) to (19) below.

$$q'_0 = \text{Clip3}(q_0 - w * t_c, \ q_0 + w * t_c, \quad\quad (17)$$

$$((p_2 + p_1 + p_0 + 2 * q_0 + q_1 + q_2 + q_3 + 4) >> 3))$$

$$q'_1 = \text{Clip3} \quad\quad (18)$$

$$(q_1 - w * t_c, \ q_1 + w * t_c, \ ((p_1 + p_0 + q_0 + 2 * q_1 + q_2 + 2 * q_3 + 4) >> 3))$$

$$q'_2 = \quad\quad (19)$$

$$\text{Clip3}(q_2 - w * t_c, \ q_2 + w * t_c, \ ((p_0 + q_0 + q_1 + 2 * q_2 + 3 * q_3 + 4) >> 3))$$

[3-2. Flow of Processes]

Figure 9:
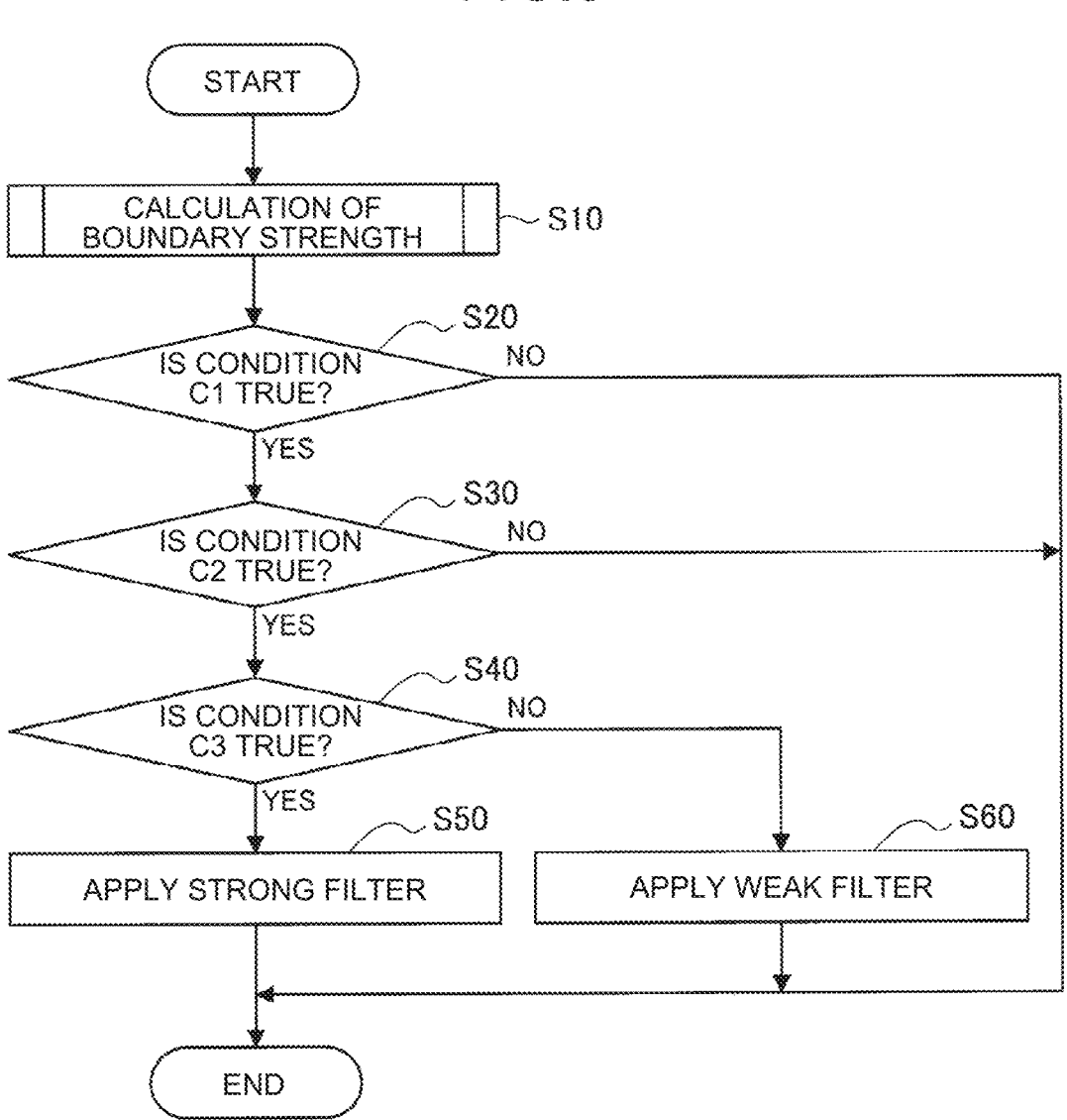
FIG. 9 is a flowchart illustrating an example of the flow of a process performed by a deblocking filter 26 according to one embodiment.

Thus, the configuration example of the deblocking filter 26 according to the present embodiment has been described above. Next, the flow of a process performed by the deblocking filter 26 according to the present embodiment will be described. FIG. 9 is a flowchart illustrating an example of the flow of the process performed by the deblocking filter 26 according to the present embodiment. Meanwhile, in the following, a process related to a feature of the present embodiment among the processes performed by the deblocking filter 26 will be explained, and explanation of other processes will appropriately be omitted.

Figure 10:
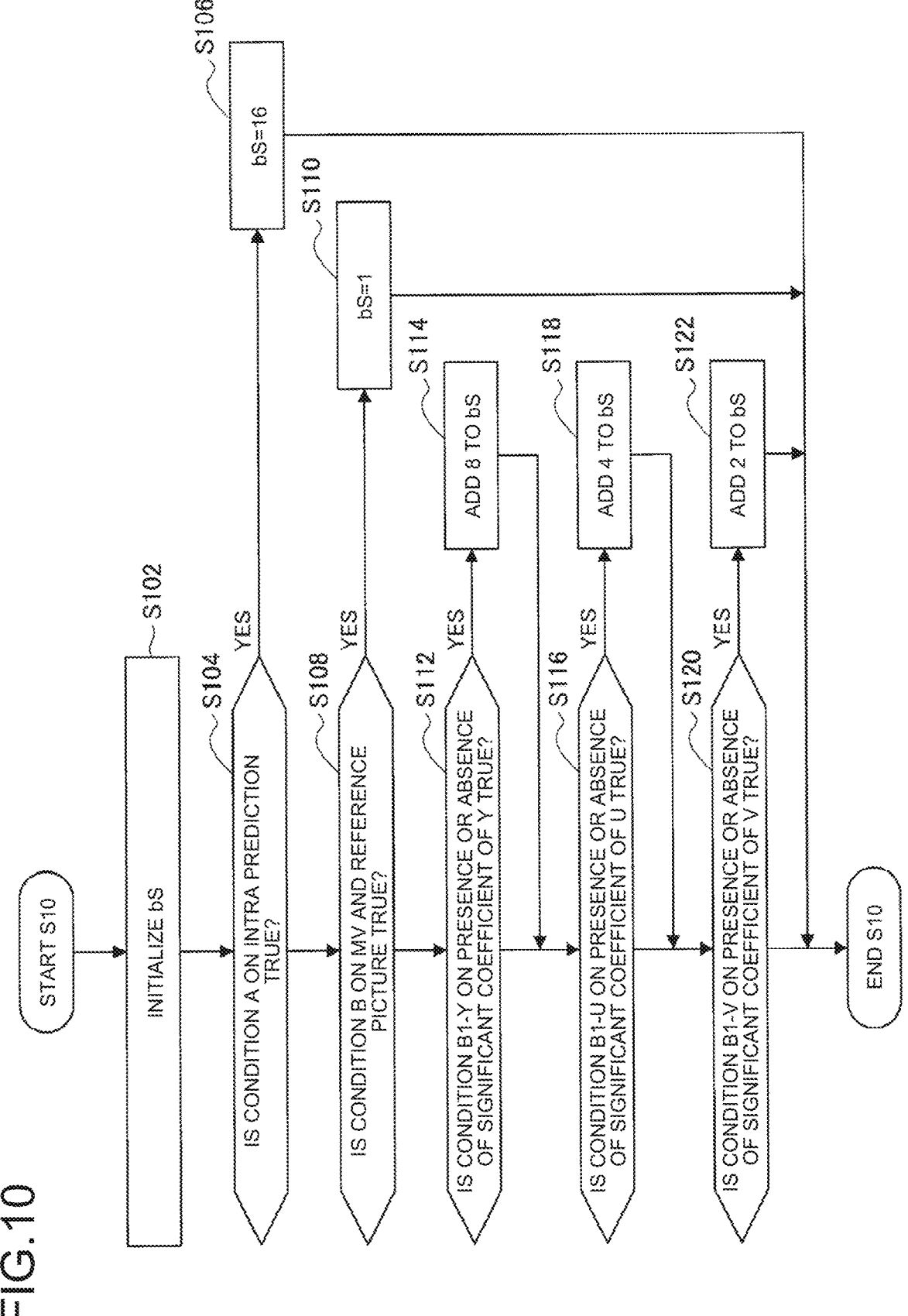
FIG. 10 is a flowchart for explaining the flow of a boundary strength calculation process performed by the boundary strength calculation unit 261.

First, the boundary strength calculation unit 261 calculates boundary strength (bS) (S10). Here, with reference to FIG. 10, a method for calculating bS will be described in detail below. FIG. 10 is a flowchart for explaining the flow of a boundary strength calculation process (S10) that is performed by the boundary strength calculation unit 261.

First, the boundary strength calculation unit 261 initializes bS to zero (S102). Subsequently, the boundary strength calculation unit 261 determines whether the condition A that is the condition on the intra prediction is true or false (S104). If the condition A is true (S104 YES at), bS is set to 16 (S106).

In contrast, if the condition A is false (NO at S104), the boundary strength calculation unit 261 determines whether the condition B that is the condition on the motion vector (MV) and the reference picture is true or false (S108). If the condition B2 is true (YES at S108), bS is set to 1 (S110).

In contrast, if the condition B2 is false (NO at S108), the boundary strength calculation unit 261 determines whether the condition B1-Y that is the condition on presence or absence of the significant coefficient of the Y component is true or false (S112). If the condition B1-Y is true (YES at S112), 8 is added to bS (S114), and thereafter the process proceeds to Step S116. In contrast, if the condition B1-Y is false (NO at S112), the process directly proceeds to Step S116.

At Step S116, the boundary strength calculation unit 261 determines the condition B1-U that is the condition on presence or absence of the significant coefficient of the U component. If the condition B1-U is true (YES at S116), 4 is added to bS (S118), and thereafter the process proceeds to Step S120. In contrast, if the condition B1-U is false (NO at S116), the process directly proceeds to Step S120.

At Step S120, the boundary strength calculation unit 261 determines the condition B1-V that is the condition on presence or absence of the significant coefficient of the V component. If the condition B1-V is true (YES at S120), 2 is added to bS (S122), and thereafter the boundary strength calculation process (S10) is terminated. If the condition B1-V is false (NO at S120), the boundary strength calculation process (S10) is directly terminated.

Referring back to FIG. 9, explanation of the flow of the process performed by the deblocking filter 26 is continued. At Step S20, the application necessity determination unit 265 of the determination unit 263 determines whether the condition C1 as described above is true or false. If the condition C1 is false (NO at S20), the process is terminated.

In contrast, if the condition C1 is true (YES at S20), the application necessity determination unit 265 determines whether the condition C2 as described above is true or false (S30). If the condition C2 is false (NO at S30), the process is terminated.

In contrast, if the condition C2 is true (S30 YES at), the filter strength determination unit 267 of the determination unit 263 determines whether the condition C3 as described above is true or false, and determines the filter strength (S40). If the condition C3 is true (YES at S40), the filtering unit 269 applies the strong filter to the color difference components of the pixels that are located in the vicinity of the block boundary (S50). In contrast, if the condition C3 is false (NO at S40), the filtering unit 269 applies the weak filter to the color difference components of the pixels that are located in the vicinity of the block boundary (S60).

Thus, the flow of the processes performed by the deblocking filter 26 according to the present embodiment has been described above. Meanwhile, the processes described above with reference to FIG. 9 and FIG. 10 may be performed in units of four lines of the luminance components of the decoded image in the YUV420 format for example, that is, in units of two lines of the color difference components of the decoded image.

[3-3. Modification]

FIG. 11 is a table illustrating a modification of bS calculated by the boundary strength calculation unit 261. Similarly to the example in FIG. 8, bS is represented by 5 bits. Further, the plurality of bits of bS includes at least one bit corresponding to each of the Y component, the U component, and the V component. The fifth bit (uppermost bit) of bS corresponds to the condition A on the intra prediction, the fourth bit of bS corresponds to the condition B1-Y on the significant coefficient of the Y component, the third bit of bS corresponds to the condition B1-U on the significant coefficient of the U component, the second bit of bS corresponds to the condition B1-V on the significant coefficient of the V component, and the first bit (lowermost bit) of bS corresponds to the condition B2 on the MV and the reference picture.

In the present modification, in particular, if the condition B1-Y is false (that is, bS is smaller than 8), the first bit of bS is set to 1, which is different from the example in FIG. 8. Consequently, while bS has any of 10 kinds of values such as 0, 1, 2, 4, 6, 8, 10, 12, 14, and 16 in the example illustrated in FIG. 8, whereas bS has any of 13 kinds of values such as 0, 1, 2, 3, 4, 5, 6, 7, 8, 10, 12, 14, and 16 in the present modification.

Figure 12A:
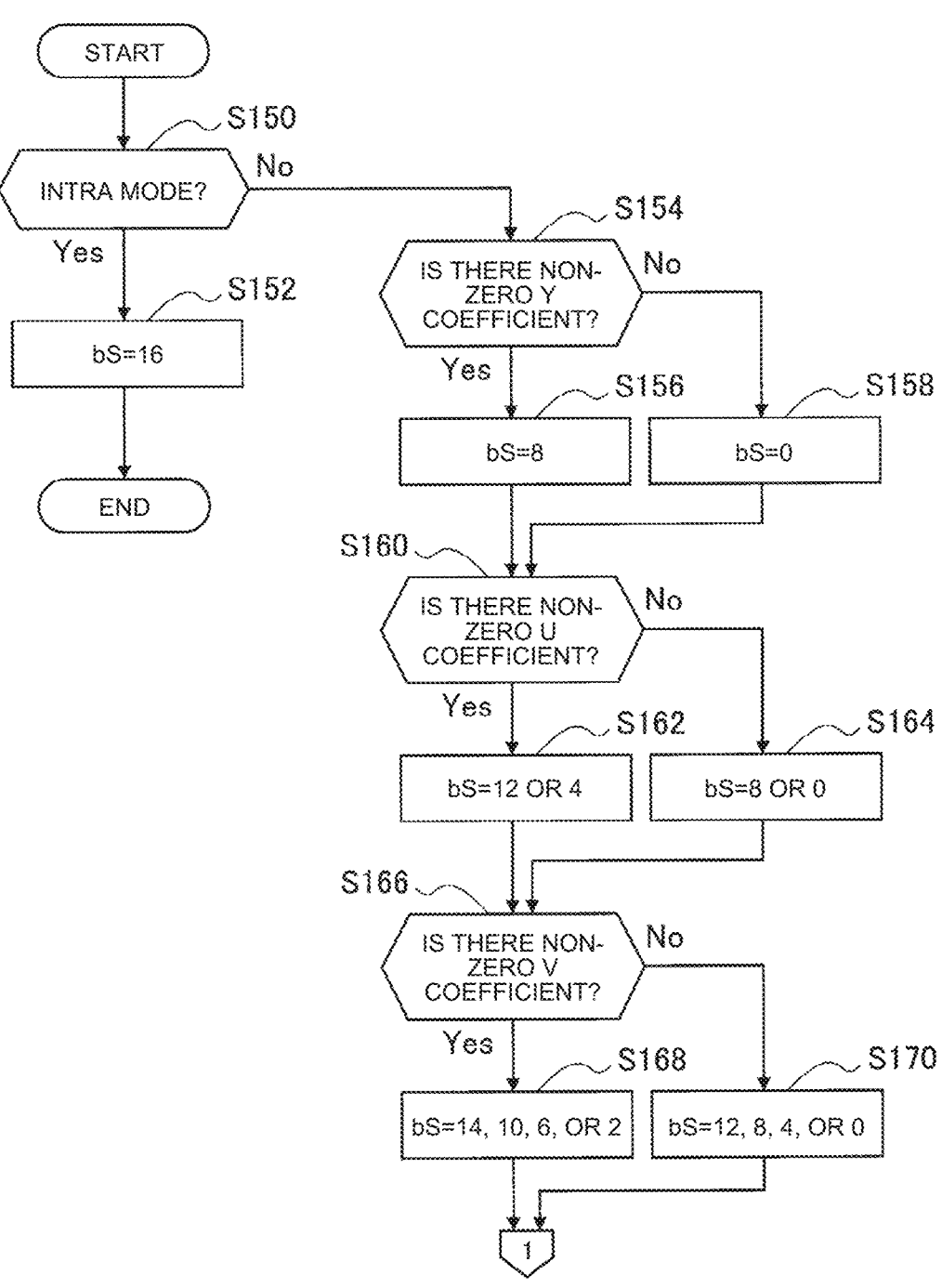
FIG. 12A is a first half of a flowchart for explaining an example of the flow of a boundary strength calculation process corresponding to the modification illustrated in FIG. 11.
Figure 12B:
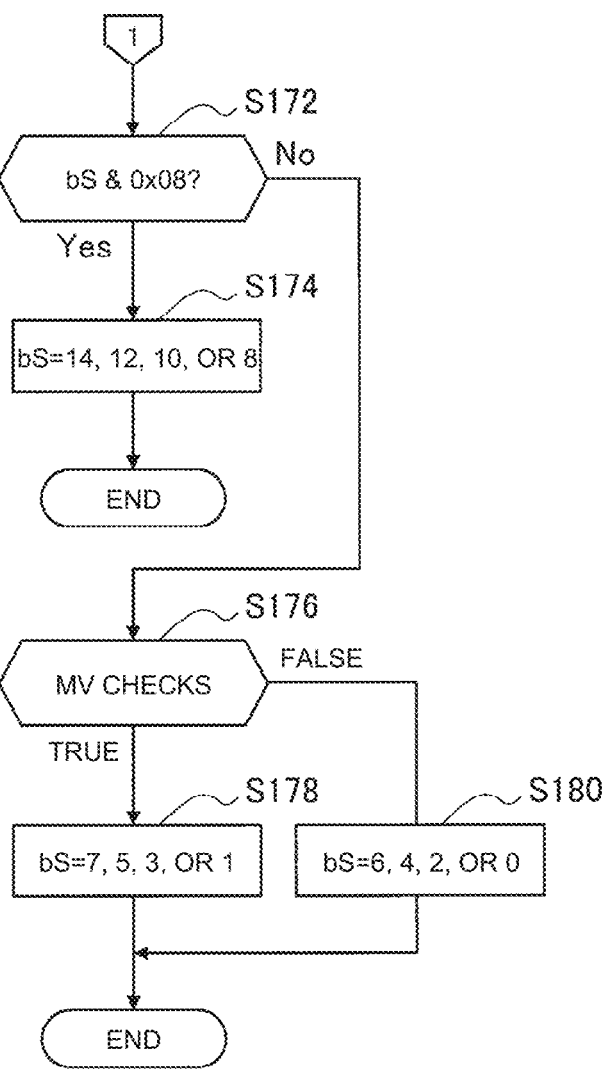
FIG. 12B is a second half of the flowchart for explaining the example of the flow of the boundary strength calculation process corresponding to the modification illustrated in FIG. 11.

FIG. 12A and FIG. 12B are flowcharts for explaining one example of the flow of a boundary strength calculation process corresponding to the modification illustrated in FIG. 11. It is assumed that bS is initialized to zero before start of the process. With reference to FIG. 12A, first, the boundary strength calculation unit 261 determines whether the condition A that is the condition on the intra prediction is true or false (S150). If the condition A is true, bS is set to 16 (S152), and the boundary strength calculation process is terminated.

If the condition A is false, the boundary strength calculation unit 261 determines whether the condition B1-Y that is the condition on presence or absence of the significant coefficient of the Y component is true or false (S154). If the condition B1-Y is true, 8 is added to bS (S156). If the condition B1-Y is false, addition of 8 is skipped (S158). Subsequently, it is determined whether the condition B1-U that is the condition on presence or absence of the significant coefficient of the U component is true or false (S160). If the condition B1-U is true, 4 is added to bS (S162), and if the condition B1-U is false, addition of 4 is skipped (S164). Subsequently, it is determined whether the condition B1-V that is the condition on presence or absence of the significant coefficient of the V component is true or false (S166). If the condition B1-V is true, 2 is added to bS (S168), and if the condition B1-V is false, addition of 2 is skipped (S170).

With reference to FIG. 12B, a subsequent process is branched depending on whether the condition B1-Y that is the condition on presence or absence of the significant coefficient of the Y component is true or false (S172). If the condition B1-Y is true, the fourth bit of bS is equal to 1, and therefore, a value of bS is set to 8 or larger (14, 12, 10, or 8) (S174), so that the boundary strength calculation process is terminated without performing MV checks to be described later.

In contrast, if the condition B1-Y is false, the boundary strength calculation unit 261 performs the MV checks (S176). The MV checks described herein indicate determination on whether the condition B2 that is the condition on the motion vector and the reference picture is true or false. If the condition B2 is true, 1 is added to bS (S178), and if the condition B2 is false, addition of 1 is skipped (S180).

4. HARDWARE CONFIGURATION EXAMPLE

The series of processes as described above may be performed by hardware or may be performed by software. If the series of processes is performed by software, a program that constitutes the software is installed in a computer. Here, the computer includes a computer that is incorporated in dedicated hardware, a general-purpose personal computer capable of implementing various functions by installing various programs, and the like.

Figure 13:
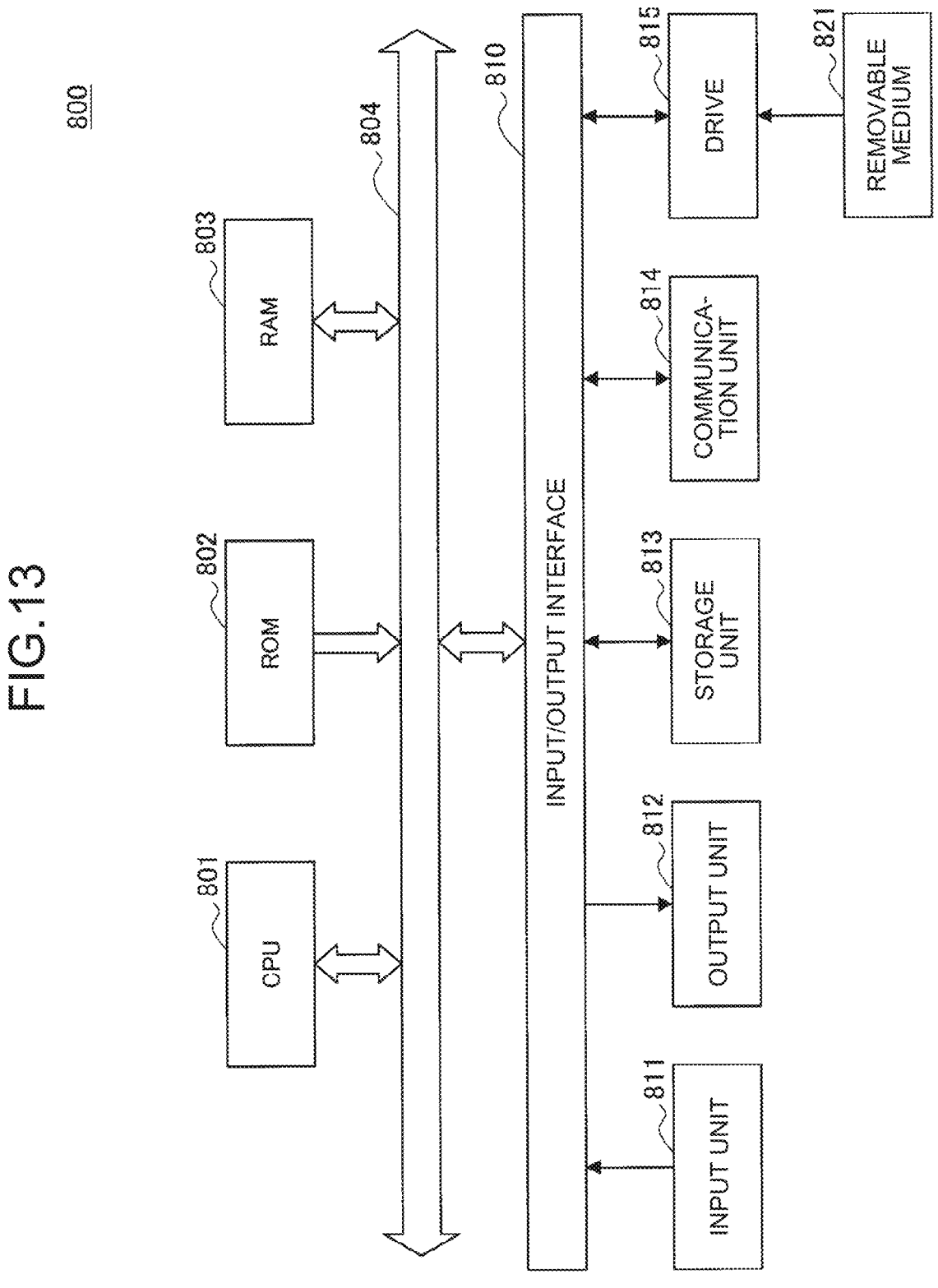
FIG. 13 is an explanatory diagram illustrating a hardware configuration example.

FIG. 13 is a block diagram illustrating a hardware configuration example of a computer that performs the series of processes as described above by using a program.

In a computer 800 illustrated in FIG. 13, a Central Processing Unit (CPU) 801, a Read Only Memory (ROM) 802, and a Random Access Memory (RAM) 803 are connected to one another via a bus 804.

An input/output interface 810 is also connected to the bus 804. An input unit 811, an output unit 812, a storage unit 813, a communication unit 814, and a drive 815 are connected to the input/output interface 810.

The input unit 811 is realized by, for example, a keyboard, a mouse, a microphone, a touch panel, an input terminal, or the like. The output unit 812 is realized by, for example, a display, a speaker, an output terminal, or the like. The storage unit 813 is realized by, for example, a hard disk, a RAM disk, a non-volatile memory, or the like. The communication unit 814 is realized by, for example, a network interface. The drive 815 drives a removable medium 821, such as a magnetic disk, an optical disk, a magneto optical disk, or a semiconductor memory.

In the computer configured as described above, the CPU 801 loads a program that is stored in, for example, the storage unit 813 onto the RAM 803 via the input/output interface 810 and the bus 804, and executes the program, so that the series of processes as described above is performed. The RAM 803 also appropriately stores therein data that is needed for various processes performed by the CPU 801.

The program executed by the computer (the CPU 801) may be recorded in and applied by the removable medium 821 as a package medium or the like, for example. In this case, by attaching the removable medium 821 to the drive 815, the program may be installed in the storage unit 813 via the input/output interface 810.

Further, the program may be provided via a wired or wireless transmission medium, such as a local area network, the Internet, or digital satellite broadcasting. In this case, the program may be received by the communication unit 814 and installed in the storage unit 813.

In addition, the program may be installed in the ROM 802 or the storage unit 813 in advance.

5. CONCLUSION

As described above, according to one embodiment of the present disclosure, it is possible to more appropriately apply a deblocking filter to color difference components of a decoded image.

While the preferred embodiments of the present disclosure have been described in detail above with reference to the accompanying drawings, the technical scope of the present disclosure is not limited to the examples as described above. It is obvious that a person skilled in the technical field of the present disclosure may conceive various alternations and modifications within the scope of the technical idea described in the appended claims, and it should be understood that they will naturally come under the technical scope of the present disclosure.

(Color Difference Related Parameter)

For example, in the embodiment described above, the example has been described in which the flag indicating presence or absence of the significant coefficients of the color difference components in each of the TUs is used as the color difference related parameter, but the present technology is not limited to this example. For example, transform coefficients of the color difference components themselves may be included in the color difference related parameter. In this case, the boundary strength calculation unit 261 may calculate bS by determining presence or absence of the significant coefficients of the color difference components in each of the TUs from the transform coefficients of the color difference components. Further, in relation to the embodiment as described above, the example has been illustrated in FIG. 4 in which the value of bS varies not only depending on whether any of the conditions B1-Y, B1-U, and B1-V is met, but also depending on whether the condition B2 is met. However, in an alternative example as illustrated in FIG. 14, for example, determination on whether the condition B2 is met may be omitted for both of the color difference components U and V in order to prevent an increase in processing costs.

(Threshold of Large Block Determination)

In the embodiment described above, the example has been described in which the threshold used in the large block determination is set to 16, but the present technology is not limited to this example, and the threshold may be set to 8 or 32. Further, in the YUV444 format, a threshold that is equal to or larger than the threshold used in the YUV420 format may be used in the large block determination.

(Strong Filter)

In the embodiment described above, the example has been described in which the strong filter represented by Equations (15) to (19) is applied to the color difference components, but the strong filter applied in the present technology is not limited to this example. It is sufficient that the strong filter applied to the color difference components has larger filter strength than the weak filter. For example, the strong filter that is applied to the color difference components in Non Patent Literature 2 (the strong filter that is applied to the luminance component in HEVC) may be applied to the color difference components in the present technology.

(Application Target of Present Technology)

The present technology may be applied to an arbitrary image coding/decoding system. That is, as long as no contradiction with the present technology as described above occurs, specifications of various processes related to image coding/decoding, such as transform (inverse transform), quantization (inverse quantization), coding (decoding), and prediction, may be set arbitrarily, and are not limited to the example as described above. Further, a part of the processes may be omitted as long as no contradiction with the present technology as described above occurs.

(Block)

Furthermore, in the present specification, the "block" (not a block indicating a processing unit) that is used as a partial region or a processing unit of an image (picture) in the explanation indicates an arbitrary partial region in the picture, and a size, a shape, characteristics, and the like of the block are not specifically limited unless otherwise specified. For example, it is assumed that the "block" includes an arbitrary partial region (processing unit), such as a Transform Block (TB) described in Reference Literatures REF1 to REF3 as described above, a Transform Unit (TU), a Prediction Block (PB), a Prediction Unit (PU), a Smallest Coding Unit (SCU), a Coding Unit (CU), a Largest Coding Unit (LCU), a Coding Tree Block (CTB), a Coding Tree Unit (CTU), a transform block, a sub block, a macro block, a tile, or a slice.

(Processing Unit)

A data unit for setting various kinds of information explained above and a data unit serving as a target for various processes are arbitrary units and not limited to the examples as described above. For example, each of the information and the processes may be set for each Transform Unit (TU), each Transform Block (TB), each Prediction Unit (PU), each Prediction Block (PB), each Coding Unit (CU), each Largest Coding Unit (LCU), each sub block, each block, each tile, each slice, each picture, each sequence, or each component, or data in the data unit may be adopted as a target. The data unit may be, of course, set for each kind of information and each process, and the data units need not be uniform for all kinds of information and processes. Meanwhile, the information may be stored in an arbitrary location, and may be stored in a header in the data unit as described above, a parameter set, or the like. Further, the information may be stored in a plurality of locations.

Furthermore, in the embodiment described above, the deblocking filtering process on the color difference components is performed in units of two lines, but the present technology is not limited to this example. For example, in the YUV444 format, the deblocking filtering process on the color difference components may be performed in units of four lines. In this case, the application necessity determination unit 265 may determine the condition C3 as described above with reference to the first line and the third line.

(Control Information)

It may be possible to transmit control information related to the present technology as described above from the coding side to the decoding side. For example, it may be possible to transmit control information (for example, enabled_flag) for controlling whether to permit (or inhibit) application of the present technology as described above. Further, for example, it may be possible to transmit control information indicating a target to which the present technology as described above is applied (or a target to which the present technology is not applied). For example, it may be possible to transmit control information for designating a block size (an upper limit, a lower limit, or both of the upper and lower limits), a frame, a component, a layer, or the like to which the present technology is applied (or for which application is permitted or inhibited).

(Block Size Information)

When designating a block size to which the present technology is applied, it may be possible to indirectly designate the block size, in addition to directly designating the block size. For example, it may be possible to designate the block size by using identification information for identifying the size. Further, for example, it may be possible to designate the block size by a ratio or a difference with respect to a size of a reference block (for example, an LCU, an SCU, or the like). For example, when information for designating a block size is to be transmitted as a syntax element or the like, it may be possible to use, as the above information, information for directly designating the size as described above. With this configuration, in some cases, it may be possible to reduce an information amount on the information and improve a coding efficiency. Further, the designation of the block size includes designation of a range of the block size (for example, designation of an acceptable block size or the like).

(Others)

In the present specification, the "flag" is information for distinguishing between various states, and includes not only information that is used to distinguish between two states of true (1) and false (0), but also information capable of distinguishing among three or more states. Therefore, the value of the "flag" may be two values of 1 and 0 or three or more values. That is, the number of bits constituting the "flag" is arbitrary, and may be 1 bit or multiple bits. Furthermore, the identification information (including the flag) may be in a form in which the identification information is included in a bit stream or in a form in which difference information on the identification information with respect to certain reference information is included in the bit stream; therefore, in the present specification, the "flag" and the "identification information" includes not only the above information, but also the difference information with respect to the reference information.

Moreover, various kinds of information (metadata or the like) on coded data (bit stream) may be transmitted or recorded in an arbitrary form as long as the information is associated with the coded data. Here, an expression of "association" indicates that, for example on one data. That is, the pieces of data associated with each other may be collected as a single piece of data or may be separated as individual pieces of data. For example, information associated with coded data (image) may be transmitted through a different transmission path from that of the coded data (image). Further, for example, information associated with coded data (image) may be recorded in a different recording medium (or a different recording area of the same recording medium) from that of the coded data (image). Meanwhile, the "association" may be performed on a part of data, instead of the whole data. For example, an image and information corresponding to the image may be associated with each other in an arbitrary unit, such as a plurality of frames, a single frame, or a part of a frame.

Meanwhile, in the present specification, expressions of "synthesis", "multiplication", "addition", "integration", "inclusion", "storage", "incorporation", "plug in", "insertion", and the like indicate collection of a plurality of items into a single item, such as collection of coded data and metadata into a single piece of data, and indicates one method of "association" as described above.

The present technology may be embodied as any configuration constituting an apparatus or a system, such as a processor as a system Large Scale Integration (LSI) or the like, a module using a plurality of processors or the like, a unit using a plurality of modules or the like, or a set in which other functions are added to units (that is, a configuration as a part of an apparatus).

Meanwhile, in the present specification, the system indicates a set of a plurality of structural elements (apparatuses, modules (parts), and the like), and it does not matter whether all of the structural elements are included in a single housing. Therefore, a plurality of apparatuses that are housed in different housings and connected to one another via a network, and a single apparatus including a plurality of modules in a single housing are systems.

Furthermore, for example, a configuration described above as a single apparatus (or processing unit) may be divided and configured as a plurality of apparatuses (or processing units). In contrast, configurations described above as a plurality of apparatuses (or processing units) may be collected and configured as a single apparatus (or processing unit). Moreover, configurations other than the above-described configurations may of course be added to each of the apparatuses (or each of the processing units). Furthermore, as long as the configuration and the operation of the whole system are substantially the same, it may be possible to incorporate a part of configurations of a certain apparatus (or processing unit) into configurations of a different apparatus (or different unit). Moreover, for example, the present technology may be configured as cloud computing in which a single function is processed by being distributed and shared between a plurality of apparatuses via a network.

Furthermore, for example, each of steps described in the flowcharts above may be performed by a plurality of apparatuses in a distributed manner, in addition to being performed by a single apparatus. Furthermore, if a plurality of processes are included in a single step, the processes included in the single step may be performed by a plurality of apparatuses in a distributed manner, in addition to being performed by a single apparatus. In other words, a plurality of processes included in a single step may be performed as processes at a plurality of steps. In contrast, processes described as a plurality of steps may collectively be performed as a single step.

Meanwhile, a program executed by the computer may be configured such that processes of the steps for writing the program are chronologically performed in the same order as described in the present specification, may be performed in a parallel manner, or may be performed independently at a necessary timing, such as when called. That is, as long as no contradiction occurs, the processes at the respective steps may be performed in a different order from the order as described above. Furthermore, processes at steps for writing the program may be performed parallel to processes of other programs, or may be performed in combination with processes of other programs.

In addition, the effects described in the present specification are merely illustrative or exemplary, and not limiting. That is, the technology according to the present disclosure may exhibit other effects apparent to those skilled in the art from the description of the present specification, in addition to or in place of the effects described above.

The following configurations are also within the technical scope of the present disclosure.

(1) An image processing apparatus comprising:
　a decoding unit configured to generate a decoded image by decoding a coded stream;
　a determination unit configured to adopt a block boundary of the decoded image as a target and determine deblocking filter application necessity with respect to color difference components of the decoded image based on boundary strength that is calculated using a color difference related parameter related to a color difference; and
　a filtering unit configured to apply a deblocking filter to color difference components of pixels located in a vicinity of the block boundary based on a determination result of the deblocking filter application necessity.

(2) The image processing apparatus according to (1), wherein
　the color difference related parameter includes information on transform coefficients of color difference components, and
　the boundary strength is calculated based on whether significant coefficients of the color difference components are present in blocks that sandwich the block boundary as a target for calculation of the boundary strength.

(3) The image processing apparatus according to (2), wherein the boundary strength is calculated by independently determining whether a significant coefficient of each of components is present in the blocks that sandwich the block boundary as the target for the calculation of the boundary strength.

(4) The image processing apparatus according to (1), wherein
　the boundary strength is represented by a plurality of bits, and
　the plurality of bits include at least one bit corresponding to each of components.

(5) The image processing apparatus according to (1), wherein the determination unit determines the deblocking filter application necessity through determination based on the boundary strength and large block determination using block sizes of blocks that sandwich the block boundary.

(6) The image processing apparatus according to (5), wherein if the boundary strength has a value related to inter prediction, the determination unit performs the large block determination.

(7) The image processing apparatus according to (5), wherein the determination unit performs the large block determination based on sizes of the blocks sandwiching the block boundary, the sizes being sizes in a direction perpendicular to the block boundary.

(8) The image processing apparatus according to (7), wherein the determination unit performs the large block determination based on whether the sizes of the blocks sandwiching the block boundary is larger than 16, the sizes being sizes in the direction perpendicular to the block boundary.

(9) The image processing apparatus according to (1), wherein the filtering unit applies, as the deblocking filter, one of a weak filter and a strong filter to the color difference components of the pixels located in the vicinity of the block boundary.

(10) The image processing apparatus according to (9), wherein a coefficient of the strong filter is set to 2 at a center position of an application target range of the strong filter, and set to 1 at other positions.

(11) The image processing apparatus according to (9), wherein the filtering unit adopts three pixels on both sides from the block boundary as an application target range of the strong filter, and applies the strong filter to color difference components of pixels included in the application target range by using three pixels on both sides of a center position of the application target range as reference pixels.

(12) The image processing apparatus according to (11), wherein the filtering unit performs padding and uses, as a pixel value of the reference pixel, a pixel value of a fourth pixel from the block boundary in place of pixels separated by five pixels or more from the block boundary.

(13) The image processing apparatus according to (10), wherein the filtering unit applies the strong filter by performing a clipping process based on a parameter tC that is identified based on a quantization parameter.

(14) The image processing apparatus according to (9), wherein the determination unit further determines filter strength of the deblocking filter that is applied to the color difference components of the pixels located in the vicinity of the block boundary, and the filtering unit applies one of the weak filter and the strong filter to the color difference components of the pixels located in the vicinity of the block boundary in accordance with the filter strength determined by the determination unit.

(15) The image processing apparatus according to (14), wherein the determination unit determines the filter strength after determination on the deblocking filter application necessity.

(16) The image processing apparatus according to (15), wherein the determination unit determines the filter strength based on waveforms of the color difference components of the pixels located in the vicinity of the block boundary.

(17) The image processing apparatus according to (16), wherein the determination unit determines the filter strength based on a condition on flatness of color difference components of pixels included in two lines among the pixels located in the vicinity of the block boundary, a condition on continuity of the color difference components, and a condition on a gap between the color difference components, and the filtering unit applies the strong filter if it is determined all of the condition on the flatness, the condition on the continuity, and the condition on the gap are met, and applies the weak filter if it is determined at least one of the conditions is not met.

(18) An image processing method comprising:

generating a decoded image by decoding a coded stream;

adopting a block boundary of the decoded image as a target;

determining deblocking filter application necessity with respect to color difference components of the decoded image based on boundary strength that is calculated using a color difference related parameter related to a color difference; and applying a deblocking filter to color difference components of pixels located in a vicinity of the block boundary based on a determination result of the deblocking filter application necessity.

(19) An image processing apparatus comprising:

a determination unit configured to adopt, as a target, a block boundary of a decoded image that is locally decoded, and determine deblocking filter application necessity with respect to color difference components of the decoded image based on boundary strength that is calculated using a color difference related parameter related to a color difference;

a filtering unit configured to apply a deblocking filter to color difference components of pixels located in a vicinity of the block boundary based on a determination result of the deblocking filter application necessity; and a coding unit configured to encode an image using the decoded image to which the deblocking filter is applied by the filtering unit.

(20) An image processing method comprising:

adopting, as a target, a block boundary of a decoded image that is locally decoded;

determining deblocking filter application necessity with respect to color difference components of the decoded image based on boundary strength that is calculated using a color difference related parameter related to a color difference;

applying a deblocking filter to color difference components of pixels located in a vicinity of the block boundary based on a determination result of the deblocking filter application necessity; and coding an image using the decoded image to which the deblocking filter is applied.

REFERENCE SIGNS LIST 10 image coding apparatus
16 invertible coding unit
26 deblocking filter
60 image decoding apparatus
62 invertible decoding unit
261 boundary strength calculation unit
263 determination unit
265 application necessity determination unit
267 filter strength determination unit
269 filtering unit

The invention claimed is:

1. An image processing apparatus comprising:

circuitry configured to:

generate a decoded image by decoding a coded stream;

determine deblocking filter application necessity with respect to color difference components of the decoded image based on boundary strength that is calculated by adopting a block boundary of the decoded image as a target, and using information related to transform coefficients of the color difference components obtained by orthogonal transformation; and apply a deblocking filter to color difference components of pixels located in a vicinity of the block boundary based on a determination result of the deblocking filter application necessity, wherein the boundary strength is calculated by independently determining whether a significant coefficient of each of components is present in the blocks that sandwich the block boundary as the target for the calculation of the boundary strength, the boundary strength is represented by five bits which correspond to a condition on intra prediction, a condition on a significant coefficient of a Y component, a condition on a significant coefficient of a U component of the color difference components, a condition on a significant coefficient of a V component of the color difference components, and a condition on a motion vector and a reference picture, respectively, determine the deblocking filter application necessity through determination based on the boundary strength and large block determination based on sizes of blocks that sandwich the block boundary, the sizes being sizes in a direction perpendicular to the block boundary of directions perpendicular to and parallel to the block boundary.

2. The image processing apparatus according to claim 1, wherein in a case in which the condition on the intra prediction is true, a bit corresponding to the condition on the intra prediction of the five bits is set to 1, and other bits are set to 0, in a case in which the condition on the intra prediction is false and the condition on the motion vector and the reference picture is true, a bit corresponding to the condition on the motion vector and the reference picture of the five bits is set to 1, and other bits are set to 0, and in a case in which the condition on the intra prediction is false and the condition on the motion vector and the reference picture is false, the bit corresponding to the condition on the intra prediction and the bit corresponding to the condition on the motion vector and the reference picture of the five bits are set to 0, and for each bit of other bits, the bit is set to 1 when a condition corresponding to the bit is true and set to 0 when the condition corresponding to the bit.

3. The image processing apparatus according to claim 1, wherein in a case in which the condition on the intra prediction is true, a bit corresponding to the condition on the intra prediction of the five bits is set to 1, and other bits are set to 0, in a case in which the condition on the intra prediction is false, the bit corresponding to the condition on the intra prediction of the five bits is set to 0, and for each bit of three bits corresponding to the condition on the significant coefficient of the Y component, the condition on the significant coefficient of the U component, the condition on the significant coefficient of the V component, respectively, of the five bits, the bit is set to 1 when a condition corresponding to the bit is true and set to 0 when the condition corresponding to the bit is false, in a case in which the condition on the intra prediction is false and the condition on the significant coefficient of the Y component is true, a bit corresponding to the condition on the motion vector and the reference picture of the five bits is set to 0, in a case in which the condition on the intra prediction is false and the condition on the significant coefficient of the Y component is false, the bit corresponding to the condition on the motion vector and the reference picture is set to 1 when the condition on the motion vector and the reference picture is true and set to 0 when the condition on the motion vector and the reference picture is false.

4. The image processing apparatus according to claim 1, wherein the five bits are corresponding to the condition on the intra prediction, the condition on the significant coefficient of the Y component, the condition on the significant coefficient of the U component, the condition on the significant coefficient of the V component, and the condition on the motion vector and the reference picture, in order from a high bit to a low bit.

5. An image processing method comprising:

generating a decoded image by decoding a coded stream;

determining deblocking filter application necessity with respect to color difference components of the decoded image based on boundary strength that is calculated by adopting a block boundary of the decoded image as a target, and using information related to transform coefficients of the color difference components obtained by orthogonal transformation; and applying a deblocking filter to color difference components of pixels located in a vicinity of the block boundary based on a determination result of the deblocking filter application necessity, wherein the boundary strength is calculated by independently determining whether a significant coefficient of each of components is present in the blocks that sandwich the block boundary as the target for the calculation of the boundary strength, the boundary strength is represented by five bits which correspond to a condition on intra prediction, a condition on a significant coefficient of a Y component, a condition on a significant coefficient of a U component of the color difference components, a condition on a significant coefficient of a V component of the color difference components, and a condition on a motion vector and a reference picture, respectively, the deblocking filter application necessity is determined through determination based on the boundary strength and large block determination based on sizes of blocks that sandwich the block boundary, the sizes being sizes in a direction perpendicular to the block boundary of directions perpendicular to and parallel to the block boundary.

6. The image processing method according to claim 5, wherein in response to the intra prediction being true, a bit corresponding to the condition on the intra prediction of the five bits is set to 1, and other bits are set to 0, in response to the intra prediction being false and the motion vector and the reference picture being true, a bit corresponding to the condition on the motion vector and the reference picture of the five bits is set to 1, and other bits are set to 0, and in response to the intra prediction being false and the motion vector and the reference picture being false, the bit corresponding to the condition on the intra prediction and the bit corresponding to the condition on the motion vector and the reference picture of the five bits are set to 0, and for each bit of other bits, the bit is set to 1 in response to a condition corresponding to the bit is true and set to 0 in response to the condition corresponding to the bit.

7. The image processing method according to claim 5, wherein
   in response to the intra prediction being true, a bit corresponding to the condition on the intra prediction of the five bits is set to 1, and other bits are set to 0,
   in response to the intra prediction being false, the bit corresponding to the condition on the intra prediction of the five bits is set to 0, and for each bit of three bits corresponding to the condition on the significant coefficient of the Y component, the condition on the significant coefficient of the U component, the condition on the significant coefficient of the V component, respectively, of the five bits, the bit is set to 1 in response to a condition corresponding to the bit is true and set to 0 in response to the condition corresponding to the bit is false,
   in response to the intra prediction being false and the condition on the significant coefficient of the Y component is true, a bit corresponding to the condition on the motion vector and the reference picture of the five bits is set to 0,
   in response to the condition on the intra prediction being false and the condition on the significant coefficient of the Y component being false, the bit corresponding to the condition on the motion vector and the reference picture is set to 1 in response to the condition on the motion vector and the reference picture being true and set to 0 in response to the condition on the motion vector and the reference picture being false.

8. The image processing method according to claim 5, wherein
   the five bits are corresponding to the condition on the intra prediction, the condition on the significant coefficient of the Y component, the condition on the significant coefficient of the U component, the condition on the significant coefficient of the V component, and the condition on the motion vector and the reference picture, in order from a high bit to a low bit.

9. An image processing apparatus comprising:
   circuitry configured to
   determine deblocking filter application necessity with respect to color difference components of a decoded image that is decoded based on local decoding process, based on boundary strength that is calculated by adopting a block boundary of the decoded image as a target, and using information related to transform coefficients of the color difference components obtained by orthogonal transformation;
   apply a deblocking filter to color difference components of pixels located in a vicinity of the block boundary based on a determination result of the deblocking filter application necessity; and
   encode an image using the decoded image to which the deblocking filter is applied by the filtering unit,
   wherein the boundary strength is calculated by independently determining whether a significant coefficient of each of components is present in the blocks that sandwich the block boundary as the target for the calculation of the boundary strength, the boundary strength is represented by five bits which correspond to a condition on intra prediction, a condition on a significant coefficient of a Y component, a condition on a significant coefficient of a U component of the color difference components, a condition on a significant coefficient of a V component of the color difference components, and a condition on a motion vector and a reference picture, respectively,
   determine the deblocking filter application necessity through determination based on the boundary strength and large block determination based on sizes of blocks that sandwich the block boundary, the sizes being sizes in a direction perpendicular to the block boundary of directions perpendicular to and parallel to the block boundary.

10. The image processing apparatus according to claim 9, wherein
   in a case in which the condition on the intra prediction is true, a bit corresponding to the condition on the intra prediction of the five bits is set to 1, and other bits are set to 0,
   in a case in which the condition on the intra prediction is false and the condition on the motion vector and the reference picture is true, a bit corresponding to the condition on the motion vector and the reference picture of the five bits is set to 1, and other bits are set to 0, and
   in a case in which the condition on the intra prediction is false and the condition on the motion vector and the reference picture is false, the bit corresponding to the condition on the intra prediction and the bit corresponding to the condition on the motion vector and the reference picture of the five bits are set to 0, and for each bit of other bits, the bit is set to 1 when a condition corresponding to the bit is true and set to 0 when the condition corresponding to the bit.

11. The image processing apparatus according to claim 9, wherein
   in a case in which the condition on the intra prediction is true, a bit corresponding to the condition on the intra prediction of the five bits is set to 1, and other bits are set to 0,
   in a case in which the condition on the intra prediction is false, the bit corresponding to the condition on the intra prediction of the five bits is set to 0, and for each bit of three bits corresponding to the condition on the significant coefficient of the Y component, the condition on the significant coefficient of the U component, the condition on the significant coefficient of the V component, respectively, of the five bits, the bit is set to 1 when a condition corresponding to the bit is true and set to 0 when the condition corresponding to the bit is false,
   in a case in which the condition on the intra prediction is false and the condition on the significant coefficient of the Y component is true, a bit corresponding to the condition on the motion vector and the reference picture of the five bits is set to 0,
   in a case in which the condition on the intra prediction is false and the condition on the significant coefficient of the Y component is false, the bit corresponding to the condition on the motion vector and the reference picture is set to 1 when the condition on the motion vector and the reference picture is true and set to 0 when the condition on the motion vector and the reference picture is false.

12. The image processing apparatus according to claim 9, wherein the five bits are corresponding to the condition on the intra prediction, the condition on the significant coefficient of the Y component, the condition on the significant coefficient of the U component, the condition on the significant coefficient of the V component, and the condition on the motion vector and the reference picture, in order from a high bit to a low bit.

13. An image processing method comprising:

determining deblocking filter application necessity with respect to color difference components of a decoded image that is decoded based on local decoding process, based on boundary strength that is calculated by adopting a block boundary of the decoded image as a target, and using information related to transform coefficients of the color difference components obtained by orthogonal transformation;

applying a deblocking filter to color difference components of pixels located in a vicinity of the block boundary based on a determination result of the deblocking filter application necessity; and coding an image using the decoded image to which the deblocking filter is applied, wherein the boundary strength is calculated by independently determining whether a significant coefficient of each of components is present in the blocks that sandwich the block boundary as the target for the calculation of the boundary strength, the boundary strength is represented by five bits, which correspond to a condition on intra prediction, a condition on a significant coefficient of a Y component, a condition on a significant coefficient of a U component of the color difference components, a condition on a significant coefficient of a V component of the color difference components, and a condition on a motion vector and a reference picture, respectively, the deblocking filter application necessity is determined through determination based on the boundary strength and large block determination based on sizes of blocks that sandwich the block boundary, the sizes being sizes in a direction perpendicular to the block boundary of directions perpendicular to and parallel to the block boundary.

14. The image processing method according to claim 13, wherein in a case in which the condition on the intra prediction is true, a bit corresponding to the condition on the intra prediction of the five bits is set to 1, and other bits are set to 0, in a case in which the condition on the intra prediction is false and the condition on the motion vector and the reference picture is true, a bit corresponding to the condition on the motion vector and the reference picture of the five bits is set to 1, and other bits are set to 0, and in a case in which the condition on the intra prediction is false and the condition on the motion vector and the reference picture is false, the bit corresponding to the condition on the intra prediction and the bit corresponding to the condition on the motion vector and the reference picture of the five bits are set to 0, and for each bit of other bits, the bit is set to 1 when a condition corresponding to the bit is true and set to 0 when the condition corresponding to the bit.

15. The image processing method according to claim 13, wherein in a case in which the condition on the intra prediction is true, a bit corresponding to the condition on the intra prediction of the five bits is set to 1, and other bits are set to 0, in a case in which the condition on the intra prediction is false, the bit corresponding to the condition on the intra prediction of the five bits is set to 0, and for each bit of three bits corresponding to the condition on the significant coefficient of the Y component, the condition on the significant coefficient of the U component, the condition on the significant coefficient of the V component, respectively, of the five bits, the bit is set to 1 when a condition corresponding to the bit is true and set to 0 when the condition corresponding to the bit is false, in a case in which the condition on the intra prediction is false and the condition on the significant coefficient of the Y component is true, a bit corresponding to the condition on the motion vector and the reference picture of the five bits is set to 0, in a case in which the condition on the intra prediction is false and the condition on the significant coefficient of the Y component is false, the bit corresponding to the condition on the motion vector and the reference picture is set to 1 when the condition on the motion vector and the reference picture is true and set to 0 when the condition on the motion vector and the reference picture is false.

16. The image processing method according to claim 13, wherein the five bits are corresponding to the condition on the intra prediction, the condition on the significant coefficient of the Y component, the condition on the significant coefficient of the U component, the condition on the significant coefficient of the V component, and the condition on the motion vector and the reference picture, in order from a high bit to a low bit.

* * * * *